US008655281B2

(12) United States Patent
Wu et al.

(10) Patent No.: US 8,655,281 B2
(45) Date of Patent: Feb. 18, 2014

(54) METHOD AND APPARATUS FOR SELECTING OBJECT TERMINAL IN A MULTI-BS MIMO SYSTEM

(75) Inventors: Keying Wu, Shanghai (CN); Yang Song, Shanghai (CN); Xiaolong Zhu, Shanghai (CN)

(73) Assignee: Alcatel Lucent, Paris (FR)

( * ) Notice: Subject to any disclaimer, the term of this patent is extended or adjusted under 35 U.S.C. 154(b) by 219 days.

(21) Appl. No.: 13/264,495

(22) PCT Filed: Apr. 16, 2009

(86) PCT No.: PCT/CN2009/000407
§ 371 (c)(1),
(2), (4) Date: Oct. 14, 2011

(87) PCT Pub. No.: WO2010/118557
PCT Pub. Date: Oct. 21, 2010

(65) Prior Publication Data
US 2012/0040702 A1 Feb. 16, 2012

(51) Int. Cl.
*H04B 1/00* (2006.01)
*H04B 15/00* (2006.01)
(52) U.S. Cl.
USPC .......... 455/63.1; 455/501; 455/524; 370/203; 370/278; 375/260; 375/267
(58) Field of Classification Search
USPC ......... 455/63.1, 501, 524; 370/203, 278, 329, 370/344; 375/260, 267, 296, 299
See application file for complete search history.

(56) References Cited

U.S. PATENT DOCUMENTS 8,059,733 B2 * 11/2011 Khojastepour et al. ....... 375/260
8,300,727 B2 * 10/2012 Huang et al. .................. 375/296
2008/0159425 A1 7/2008 Khojastepour

FOREIGN PATENT DOCUMENTS

| CN | 101257367 A | 9/2008 |
| CN | 101370240 A | 2/2009 |
| CN | 101373998 A | 2/2009 |

OTHER PUBLICATIONS

International Search Report for PCT/CN2009/000407 dated Jan. 28, 2010.

* cited by examiner

*Primary Examiner* — Tuan H Nguyen
(74) *Attorney, Agent, or Firm* — Fay Sharpe LLP

(57) ABSTRACT

According to an embodiment of the present invention, on a radio resource block for Multi-BS MIMO, one of the coordinating base stations selects a mobile terminal at first, and informs the other base stations of the characterization information and the pre-coding information etc. of the selected mobile terminal, and the selection made by the other base stations will obey the selection result of the base station that selects at first. By applying the method and apparatus provided by the present invention, the joint selection of object terminals in the Multi-BS MIMO is realized, and such selection is distributed without any central scheduling device which is necessary in the central scheduling scheme. In addition, only very limited information exchange among the coordinating base stations is required to realize the present invention. According to an embodiment of the present invention, the object terminals selected by the coordinating base stations are matched well with each other such that the total performance of the system is improved; according to an embodiment of the present invention, the fairness among the base stations can be well satisfied.

15 Claims, 13 Drawing Sheets

METHOD AND APPARATUS FOR SELECTING OBJECT TERMINAL IN A MULTI-BS MIMO SYSTEM

FIELD OF THE INVENTION

The present invention relates to a multi-BS Multiple-Input Multiple-Output (MIMO) system, more particularly, to method and apparatus for selecting object terminals in the multi-BS MIMO system.

BACKGROUND OF THE INVENTION

With the constantly growing demand for high data rate and the scarcity of radio spectrum resources, frequency reuse technique is more and more adopted in cellular systems. However, high frequency reuse factor inevitably increases the inter-cell interference (ICI) and thus impacts spectrum efficiency.

To solve this problem, many solutions have been proposed in the field, wherein multi-BS MIMO is the most promising solution. Compared with other alternatives such as micro-diversity and fractional frequency reuse, multi-BS MIMO has the advantage of increasing both cell-edge performance and system throughput. Multi-BS MIMO has become an important element in many standards such as IEEE802.16m and 3GPP LTE-Advanced (3rd Generation Partnership Project Long Term Evolution-Advanced).

In a conventional single-BS MIMO system, a base station uses its multiple transmit antenna to send multiple data streams to mobile terminals within a cell. In such system, each base station independently selects mobile terminals. In other words, which mobile terminals a base station selects is unknown to other base stations.

In a multi-BS MIMO system, joint selection for mobile terminals among coordinating base stations is required to optimize performance. However, the selection strategies for mobile terminals in the single-BS system cannot meet such requirements.

Centralized scheduling can be adopted to solve the above problem, wherein a centralized scheduling device is required, and it can either be a dedicated scheduling device or be integrated in a certain base station. Such centralized scheduling device is responsible for determining which mobile terminals are to be served by multi-BS by means of joint pre-coding, determining which mobile terminals are to be served by its serving base station with interference being cancelled by other base stations, and informing each of coordinating base stations of the determined results.

However, the network is required to be flat in some of recent upper layer standards. This is mainly because that there are more levels in the network adopting centralized scheduling and this easily causes high delay in data or signaling transmission, which cannot be accepted by many delay-sensitive services. Additionally, in the centralized scheduling way, RNC is often served as the scheduling device, which causes heavier load to the RNC, whilst the load of the RNC can be reduced by adopting flat, distributed scheduling way.

Although distributed scheduling is preferred by the above upper layer standards, no company has provided any feasible selecting strategy for mobile terminals for distributed scheduling in multi-BS MIMO system.

SUMMARY OF THE INVENTION

The present invention is proposed to solve the above problems in the prior art. According to an embodiment of the present invention, on a radio resource block used for multi-BS MIMO, one of base stations coordinating with each other firstly makes a selection and informs the other base stations of characterization information, pre-coding information etc. of the selected mobile terminal, and the selection made by other base stations will obey the selecting result of the base station that firstly selects.

According to a first aspect of the present invention, a method of selecting, in a base station, an object terminal for joint pre-coding among said base station and one or more coordinating base stations is provided, wherein, for a radio resource block, said base station has priority over said one or more coordinating base station in selecting. The method comprises the following steps: a. selecting, from at least one mobile terminal served by said base station, a mobile terminal as an object terminal to be served using said radio resource block; b. sending characterization information and pre-coding information of said object terminal to each coordinating base station, for each coordinating base station to select, from mobile terminals served by it, an other object terminal to be served using said radio resource block; c. receiving characterization information and pre-coding information of the other object terminal selected by each coordinating base station to be served using said radio resource block sent from each coordinating base station.

According to a second aspect of the present invention, a method of selecting, in a base station, an object terminal for Multi-BS joint pre-coding among said base station and one or more coordinating base stations is provided, wherein, for a radio resource block, at least one of said one or more coordinating base station has priority over said base station in selecting. The method comprises the following steps: A. receiving, from said at least one coordinating base station, characterization information and pre-coding information of an object terminal that is selected and to be served using said radio resource block by each coordinating base station; B. selecting, from said at least one mobile terminal, a mobile terminal as an object terminal to be served using said radio resource block according to the pre-coding information of an object terminal respectively selected by said one or more coordinating base stations; C. sending the characterization information and pre-coding information of the object terminal selected by said base station to said one or more coordinating base stations.

According to a third aspect of the present invention, a method of assisting, in a mobile terminal, selecting an object terminal for multi-BS joint pre-coding is provided, wherein the method comprises the following steps: o. receiving common pilot signals from a serving base station of said mobile terminal and one or more other base stations; p. determining pre-coding information of said mobile terminal based on channel state information estimated by the common pilot signals from said serving base station and said one or more other base stations, wherein the pre-coding information comprises a plurality of pre-coding vectors which are in one-to-one correspondence with said serving base station and each of said other base station, and each of said pre-coding vectors enables that the quality of the pre-coded effective signal satisfies a first predetermined condition at said mobile terminal when the corresponding base station uses the pre-coding vector to pre-code a signal sent to the mobile terminal; q. sending the determined pre-coding information to said serving base station.

According to a fourth aspect of the present invention, a method of assisting, in a mobile terminal, selecting an object terminal for multi-BS joint pre-coding is provided, wherein for a radio resource block, a base station serving said mobile terminal has lower priority in selecting than a coordinating base station. Said method comprises the following steps: —receiving pre-coding information of an object terminal respectively selected by said at least one coordinating base station to be served using said radio resource block sent by said served base station; —determining pre-coding information of said mobile terminal and calculating effective power information based on the pre-coding information of the object terminal respectively selected by said at least one coordinating base station to be served using said radio resource block; wherein a second predetermined condition is satisfied between the pre-coding information sent by each mobile terminal and the pre-coding information of an object terminal selected by any one of said at least one coordinating base station to be served using said radio resource block; wherein the effective power information sent by each mobile terminal indicates the effective signal power value at the mobile terminal when said base station and said at least one coordinating base station respectively use a corresponding pre-coding vector in the pre-coding information sent by the mobile terminal; said method further comprises: —informing said serving base station of the determined pre-coding information of said mobile terminal and the calculated effective power information.

According to a fifth aspect of the present invention, a method of selecting, in a base station, an object terminal for Multi-BS interference cancellation performed by said base station and one or more coordinating base stations is provided, wherein, for a radio resource block, said base station has higher priority in selecting than said one or more coordinating base stations. The method comprises the following steps: x. selecting, from at least one mobile terminal served by said base station, an object terminal, wherein said base station will use said radio resource block to serve the object terminal, and said one or more coordinating base stations will cancel interference to said object terminal on said radio resource block; y. sending pre-coding information of said object terminal to each coordinating base station, for each coordinating base station to select, from mobile terminals served by it, an other object terminal, wherein said coordination base station will use said radio resource block to serve the other object terminal, and said base station and other coordinating base stations will cancel interference to the other object terminal on said radio resource block.

According to a sixth aspect of the present invention, a method of selecting, in a base station, an object terminal for Multi-BS interference cancellation performed by said base station and a coordinating base station is provided, wherein, for a radio resource block, said base station has lower priority in selecting than a first coordinating base station of said one or more coordinating base stations. The method comprises the following steps: J. receiving pre-coding information of an other object terminal selected by said first coordinating base station sent by said first coordinating base station; K. broadcasting the received pre-coding information of said other object terminal; L. receiving signal quality related information calculated and fed back based on said broadcasted pre-coding information by at least one mobile terminal served by said base station; M. selecting an object terminal from said at least one mobile terminal based on the received signal quality related information.

According to a seventh aspect of the present invention, A method of assisting, in a mobile terminal, its serving base station to select an object terminal for multi-BS interference cancellation among the serving base station and one or more coordinating base stations is provided, wherein, for a radio resource block, said serving base station has higher priority in selecting than said one or more coordinating base stations. Said method comprises the following steps: —receiving common pilot signals from said serving base station and each coordinating base station; —estimating channel state information based on the common pilot signals from said serving base station and each coordinating base station, and determining pre-coding information of said mobile terminal which comprises a plurality of pre-coding vectors which are in one-to-one correspondence with said serving base station and each coordinating base station, and the pre-coding vector corresponding to said base station satisfies a third predetermined condition, whilst the pre-coding vector corresponding to any coordinating base station satisfies a fourth predetermined condition; —sending the determined pre-coding information to said serving base station.

According to an eighth aspect of the present invention, a method of assisting, in a mobile terminal, its serving base station to select an object terminal for multi-BS interference cancellation among the serving base station and one or more coordinating base stations is provided, wherein, for a radio resource block, said serving base station has lower priority in selecting than a first coordinating base station of said one or more coordinating base stations. Said method comprises the following steps: —receiving pre-coding information of an other object terminal selected by said first coordinating base station broadcasted by said serving base station; —calculating signal quality related information based on the pre-coding information of said other object terminal; —informing said serving base station of said signal quality related information.

According to a ninth aspect of the present invention, a first apparatus in a base station for selecting an object terminal for joint pre-coding among said base station and one or more coordinating base stations is provided, wherein, for a radio resource block, said base station has priority over said one or more coordinating base station in selecting. Said first apparatus comprises: a first selecting unit, for selecting, from at least one mobile terminal served by said base station, a mobile terminal as an object terminal to be served using said radio resource block; a first sending unit, for sending characterization information and pre-coding information of said object terminal to each coordinating base station, for each coordinating base station to select, from mobile terminals served by it, an other object terminal to be served using said radio resource block; a first receiving unit, for receiving characterization information and pre-coding information of the other object terminal selected by each coordinating base station to be served using said radio resource block sent from each coordinating base station.

According to a tenth aspect of the present invention, a second apparatus in a base station for selecting an object terminal for Multi-BS joint pre-coding among said base station and one or more coordinating base stations is provided, wherein, for a radio resource block, at least one of said one or more coordinating base station has priority over said base station in selecting. The second apparatus comprises: a third receiving unit, for receiving, from said at least one coordinating base station, characterization information and pre-coding information of an object terminal that is selected and to be served using said radio resource block by each coordinating base station; a second selecting unit, for selecting, from said at least one mobile terminal, a mobile terminal as an object terminal to be served using said radio resource block according to the pre-coding information of an object terminal respectively selected by said one or more coordinating base stations; a second sending unit, for sending the characterization information and pre-coding information of the object terminal selected by said base station to said one or more coordinating base stations.

According to an eleventh aspect of the present invention, a third apparatus in a mobile terminal for assisting selecting an object terminal for multi-BS joint pre-coding is provided, wherein the third apparatus comprises: a sixth receiving unit, for receiving common pilot signals from a serving base station of said mobile terminal and one or more other base stations; a first determining unit, for determining pre-coding information of said mobile terminal based on channel state information estimated by the common pilot signals from said serving base station and said one or more other base stations, wherein the pre-coding information comprises a plurality of pre-coding vectors which are in one-to-one correspondence with said serving base station and each of said other base station, and each of said pre-coding vectors enables that the quality of the pre-coded effective g satisfies a first predetermined condition at said mobile terminal when the corresponding base station uses the pre-coding vector to pre-code a signal sent to the mobile terminal; a third sending unit, for sending the determined pre-coding information to said serving base station.

According to a twelfth aspect of the present invention, a fourth apparatus in a mobile terminal for assisting selecting an object terminal for multi-BS joint pre-coding is provided, wherein for a radio resource block, a base station serving said mobile terminal has lower priority in selecting than a coordinating base station. Said fourth apparatus comprises: a seventh receiving unit, for receiving pre-coding information of an object terminal respectively selected by said at least one coordinating base station to be served using said radio resource block sent by said serving base station; a second determining unit, for determining pre-coding information of said mobile terminal and calculating effective power information based on the pre-coding information of the object terminal respectively selected by said at least one coordinating base station to be served using said radio resource block; wherein a second predetermined condition is satisfied between the determined pre-coding information and the pre-coding information of an object terminal selected by any one of said at least one coordinating base station to be served using said radio resource block; wherein the calculated effective power information indicates the power of the pre-coded effective signal at the mobile terminal when said base station and said at least one coordinating base station respectively use a corresponding pre-coding vector the pre-coding information determined by the mobile terminal; said fourth apparatus further comprises: —a first informing unit, for informing said serving base station of the determined pre-coding information of said mobile terminal and the calculated effective power information.

According to a thirteenth aspect of the present invention, a fifth apparatus in a base station for selecting an object terminal for Multi-BS interference cancellation performed by said base station and one or more coordinating base stations is provided, wherein, for a radio resource block, said base station has higher priority in selecting than said one or more coordinating base stations. The fifth apparatus comprises: a third selecting unit, for selecting, from at least one mobile terminal served by said base station, an object terminal, wherein said base station will use said radio resource block to serve the object terminal, and said one or more coordinating base stations 11 cancel interference to said object terminal on said radio resource block; a fourth sending unit, for sending pre-coding information of said object terminal to each coordinating base station, for each coordinating base station to select, from mobile terminals served by it, an other object terminal, wherein said coordination base station will use said radio resource block to serve the other object terminal, and said base station and other coordinating base stations will cancel interference to the other object terminal on said radio resource block.

According to a fourteenth aspect of the present invention, a sixth apparatus in a base station for selecting an object terminal for multi-BS interference cancellation performed by said base station and a coordinating base station is provided, wherein, for a radio resource block, said base station has lower priority in selecting than a first coordinating base station of said one or more coordinating base stations. The sixth apparatus comprises: a ninth receiving unit, for receiving pre-coding information of an other object terminal selected by said first coordinating base station sent by said first coordinating base station; a fifth broadcasting unit, for broadcasting the received pre-coding information of said other object terminal; a tenth receiving unit, for receiving signal quality related information calculated and fed back based on said broadcasted pre-coding information by at least one mobile terminal served by said base station; a fourth selecting unit, for selecting an object terminal from said at least one mobile terminal based on the received signal quality related information.

According to a fifteenth aspect of the present invention, a seventh apparatus in a mobile terminal for assisting its serving base station to select an object terminal for multi-BS interference cancellation among the serving base station and one or more coordinating base stations is provided, wherein, for a radio resource block, said serving base station has higher priority in selecting than said one or more coordinating base stations. Said seventh apparatus comprises: an eleventh receiving unit, for receiving common pilot signals from said serving base station and each coordinating base station; a third determining unit, for estimating channel state information based on the common pilot signals from said serving base station and each coordinating base station, and determining pre-coding information of said mobile terminal which comprises a plurality of pre-coding vectors which are in one-to-one correspondence with said serving base station and each coordinating base station, and the pre-coding vector corresponding to said base station satisfies a third predetermined condition, whilst the pre-coding vector corresponding to any coordinating base station satisfies a fourth predetermined condition; a fifth sending unit, for sending the determined pre-coding information to said serving base station.

According to a sixteenth aspect of the present invention, an eighth apparatus in a mobile terminal for assisting its serving base station to select an object terminal for multi-BS interference cancellation among the serving base station and one or more coordinating base stations is provided, wherein, for a radio resource block, said serving base station has lower priority in selecting than a first coordinating base station of said one or more coordinating base stations. Said eighth apparatus comprises: a twelfth receiving unit, for receiving pre-coding information of an other object terminal selected by said first coordinating base station broadcasted by said serving base station; a calculating unit, for calculating signal quality related information based on the pre-coding information of said other object terminal; a second informing unit, for informing said serving base station of said signal quality related information.

By applying the method and apparatus provided by the present invention, joint selection of object terminals in a multi-BS MIMO system is achieved. Such selection is distributed without any centralized scheduling device necessary for centralized scheduling scheme. Additionally, in order to implement the present invention, only very limited information interaction is required among base stations cooperating with each other. According to a particular embodiment of the present invention, the object terminals selected by the coordinating base stations are well matched, thereby increasing the overall performance of the system; according to a particular embodiment of the present invention, the fairness among the base stations can be well satisfied.

BRIEF DESCRIPTION OF DRAWINGS

With reference to the following detailed description of the non-restrictive embodiments in combination with the accompany drawings, other features, advantages of the present invention will be more apparent. Wherein, same or similar reference numerals refer to same or similar step features or apparatus (module) features.

DETAILED DESCRIPTION OF EMBODIMENTS

Prior to the detailed description of each particular embodiments of the present invention in combination with the accompanying drawings, some concepts, descriptions are firstly explained for better understanding.

Figure 1A:
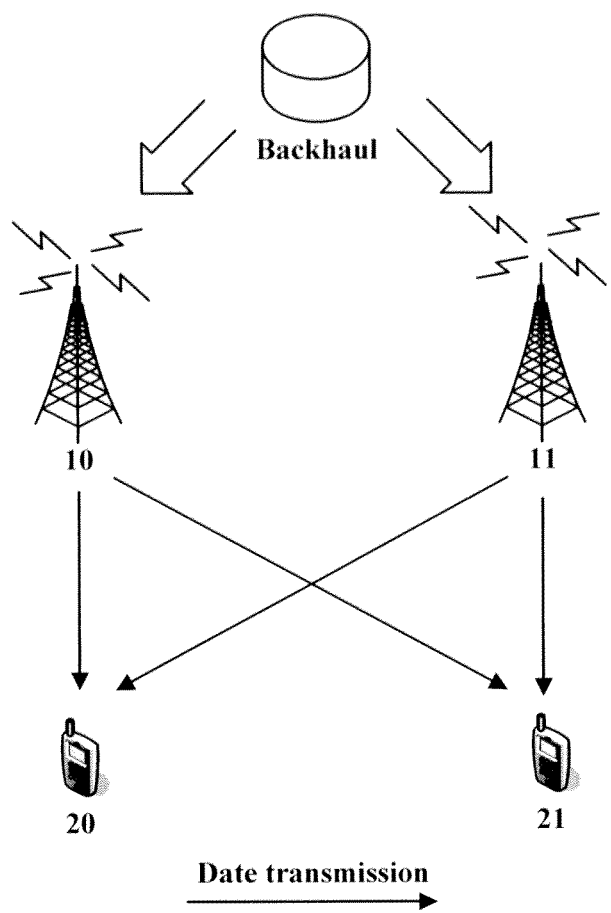
FIG. 1a is a schematic view of a multi-BS MIMO system based on joint pre-coding.
Figure 1B:
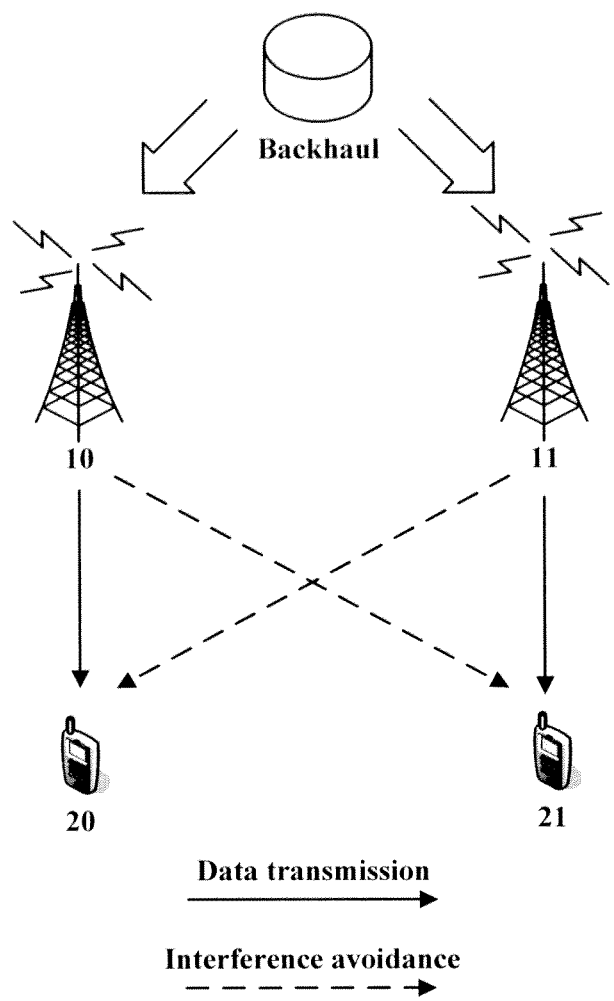
FIG. 1b is a schematic view of a multi-BS MIMO system based on interference cancellation.

Multi-BS MIMO discussed herein mainly has the following two forms: joint pre-coding (as shown in FIG. 1a) and interfere cancellation (as shown in FIG. 1b). Base stations performing joint precoding or interference cancellation together are coordinating base stations to each other. For example, base station 11 in FIG. 1a is a coordinating base station of base station 10. Regardless of joint pre-coding or interference cancellation, all object terminals selected by base stations coordinating with each other for the same radio resource block are regarded as being served by these base stations using the radio resource block.

Referring to FIG. 1a, in the way of using joint pre-coding, base stations 10 and 11 coordinating with each other jointly send downlink data to mobile terminal 20 and 21 on the same radio resource block. Taking mobile terminal 20 as an example, voice data sent from its communicating counterpart arrives at base stations 10 and 11 via core network (not shown for brevity), and is individually sent to mobile terminal 20 by these two base stations. As shown in FIG. 1a, each base station sends two data streams, each of which corresponds to one of mobile terminal 20 and 21.

Referring to FIG. 1b, in the way of using interference cancellation, base stations 10 and 11 each send downlink data to a mobile terminal in respective cell. In particular, base station 10 sends downlink data to mobile terminal 20 and cancels or avoids the resulting interference to mobile terminal 21; similarly, base station 11 sends downlink data to mobile terminal 21 and cancels or avoids the resulting interference to mobile terminal 20.

Wherein, a radio resource block is a time-frequency resource block, for example.

There is a coordinating relationship among multiple base stations performing joint pre-coding or interference cancellation. Hereinafter, the description of "coordinating with each other" is omitted without confusing. That is, when reciting "base station A and base station B", it is implicitly indicated that there is a coordinating relationship between A and B.

Additionally, "downlink data" and "downlink signal" are not distinguished in this disclosure.

In this disclosure, each mobile terminal selected for multi-BS MIMO (joint pre-coding or interference cancellation) is called object terminal. Wherein, an object terminal is often selected by a base station for a particular time-frequency resource block, and an object terminal selected by a base station for a time-frequency resource block is also called an object terminal on this time-frequency resource block or an object terminal corresponding to this time-frequency resource block.

It should be understood that when applying the present invention, the coordinating way among multiple base stations coordinating with each other can be purely joint pre-coding, can be purely interference cancellation or both coordinating way can exist simultaneously. For example, joint pre-coding is performed on one time-frequency resource block and interference cancellation is performed on another time-frequency resource block.

According to the present invention, the size of a time-frequency resource block can be static, semi-static or dynamic. When the traffic of a mobile terminal is larger than the size of the time-frequency resource block, it may occupy multiple time-frequency resource blocks, namely that when its serving base station selects object terminal for multiple time-frequency resource blocks, this mobile terminal may be selected repeatedly.

In a multi-BS MIMO system, the system performance is significantly impacted by the spatial characterization of each object terminal on a time-frequency resource block. If a base station sends downlink signal to an object terminal in its cell, and performs interference cancellation for other objects served by other coordinating base stations, this means that the signal of said object terminal must fall into the null space of the channels of the other objects. Such limitation causes loss to the signal power of said object terminal. When the spatial characterizations of these object terminals are almost orthogonal, the signal power loss is relatively small; otherwise, the signal power loss may be very large.

Based on the disclosure of this problem, the present invention provides method and apparatus for appropriately selecting object terminals in these two ways of joint pre-coding and interference cancellation. Several examples are given in the following.

Figure 2:
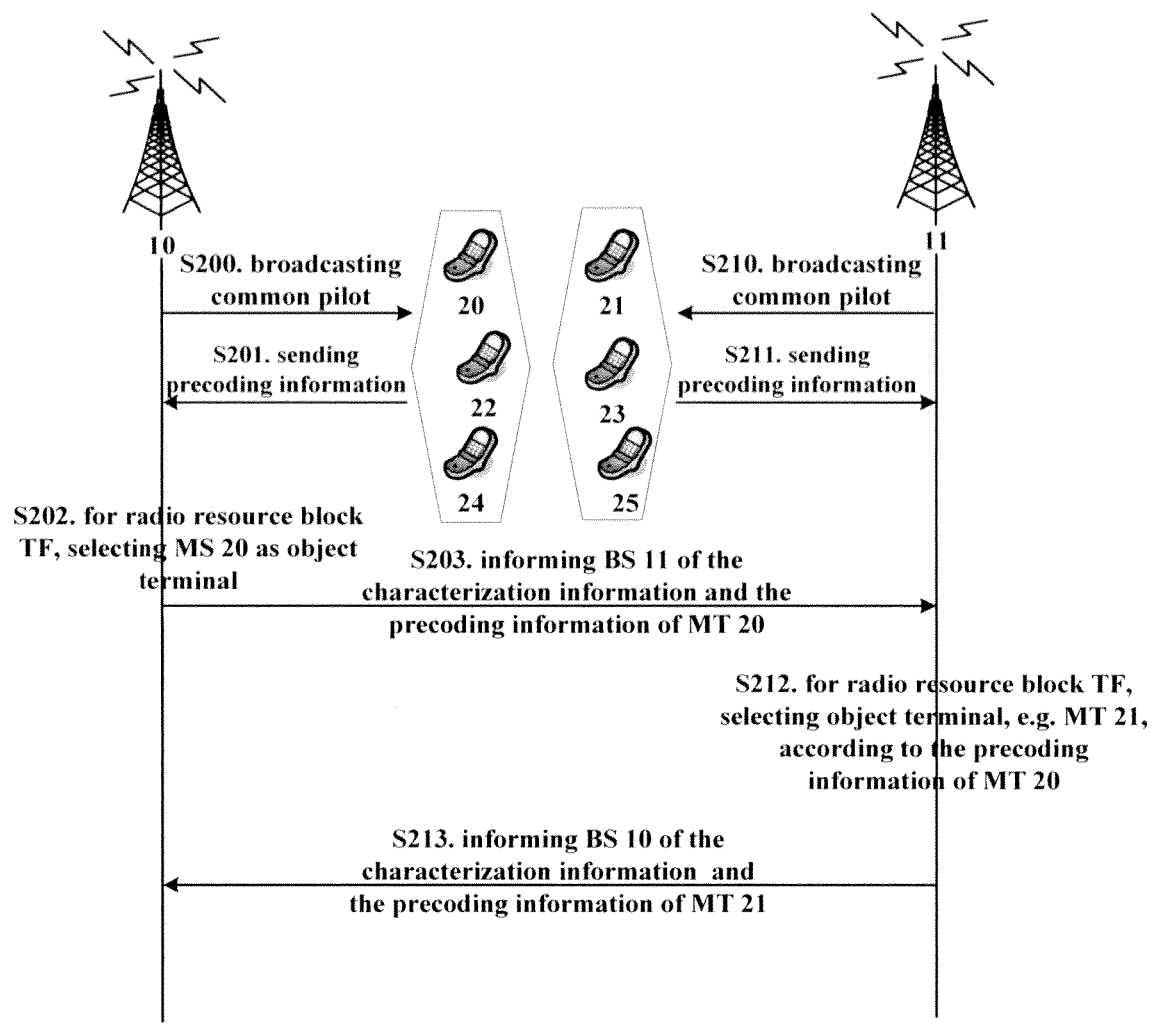
FIG. 2 illustrates a flow chart for a method of selecting object terminals in a multi-BS MIMO system based on joint pre-coding according to a particular embodiment of the present invention.

The flow chart for a method of selecting object terminals in a multi-BS MIMO system based on joint pre-coding is illustrated in FIG. 2, wherein the case of two base stations is taken as an example, base station 10 serves mobile terminal 20, 22 and 24, and base station 11 serves mobile terminal 21, 23 and 25.

Firstly, in steps S200 and S210, both base stations 10 and 11 each broadcast a common pilot. Taking the common pilot sent by base station 11 as an example, it can be received by each mobile terminal in the cell served by base station 11 and the adjacent cells so as to be used by these mobile terminals to perform channel estimation for downlink channel based on the received common pilot signal. Wherein preferably, the common pilots broadcasted by the two base stations are orthogonal to each other, and such orthogonality can be either in frequency domain or in time domain.

After receiving the common pilots sent by the two base stations, a mobile terminal in the two cells measures the signal quality, and selects two pre-coding vectors from a codebook according to the measurements. The two pre-coding vectors preferably satisfies a first predetermined condition, which is non-limitedly expressed by the following formulas:

$$v_1 = \operatorname*{argmax}_{c \in C}(\|H_1 c\|) \quad (1)$$

$$v_2 = \operatorname*{argmax}_{c \in C}(\|H_2 c\|) \quad (2)$$

Taking mobile terminal 20 served by base station 10 as an example, $v_1$ corresponding to base station 10, $v_2$ corresponding to base station 11. $H_1$, $H_2$ represent the channel matrix between base station 10, 11 and mobile terminal 20, respectively. Accordingly, $\|H_1 c\|$ represents the power of the pre-coded effective signal received at mobile terminal 20 after base station 10 uses pre-coding vector c in codebook C to pre-code downlink signal to be sent to mobile terminal 20; $\|H_2 c\|$ represents the power of the pre-coded effective signal received at mobile terminal 20 after base station 11 uses pre-coding vector c in codebook C to pre-code downlink signal to be sent to mobile terminal 20.

Further, formulas (1) and (2) represent that the pre-coding vectors v1 and v2 selected by mobile terminal 20 from codebook C enable the pre-coded effective signal to achieve power maximization at mobile terminal 20 after base stations 10, 11 use corresponding pre-coding vectors to pre-code downlink signal. The so-called maximization refers to that at mobile terminal 20, the power of the effective signal pre-coded with the pre-coding vector selected by mobile terminal 20 is greater than that pre-coded with other pre-coding vectors in the codebook.

In this example, in step S201, mobile terminals 20, 22, 24 served by base station 10 each select two pre-coding vectors and send them to the serving base station 10. In step S211, mobile terminals 21, 23, 25 served by base station 11 each select two pre-coding vectors and send them to the serving base station 11 as pre-coding information. The pre-coding information generally belongs to short-term channel information.

Preferably, the procedure for broadcasting common pilot by a base station and sending pre-coding information by a mobile terminal to the serving base station is repeatedly performed at a predetermined period.

The procedure for selecting object terminals for time-frequency resource block TF by base stations 10, 11 will be described below. It should be understood that since the selection of object terminals are normally based on long-term channel information, whether base station starts the selection of object terminals or not does not dependent on whether a certain time of executing step S201 had ended or not. Even if a mobile terminal does not send the latest pre-coding information, a base station may perform the required interaction (which will discussed below) based on the pre-coding information received before and saved.

In step S202, base station 10 selects, from mobile terminal 20, 22 and 24, a mobile terminal such as mobile terminal 20 as the object terminal to be served using time-frequency resource block TF according to proportional fair principle or maximum capacity principle. Base station 10 may perform the above selection according to physical signal to inference and noise ratio (before detection) or effective signal to interference and noise ratio (after detection) of each mobile terminal on each frequency band. The term "detection" in "before detection" and "after detection" refers to signal detection performed on the received signal.

The selection according to proportional fair principle may be interpreted as selecting the mobile terminal with maximum value of $$\frac{x_i}{y_i},$$

wherein $x_i$ is the instant capacity which can be achieved by selecting the i-th mobile terminal as the object terminal, $y_i$ is the total capacity achieved by the i-th mobile terminal in a previous time period.

The selection according to maximum capacity principle, as the name suggests, is to select the mobile terminal which ensures that the system instant capacity is maximized as the object terminal.

According a principle of the present invention, for any time-frequency resource block that can be individually used to achieve Multi-BS MIMO, multiple base stations need to select object terminal one after another, and the selection of the base station selecting later is normally constrained by the selecting results of the base station selecting earlier.

Base on this principle, after mobile terminal 20 is selected in step S202, base station 10 sends characterization information and pre-coding information of mobile terminal 20 to other coordinating base station 11. Since base station 11 also needs to send useful downlink signal to mobile terminal 20, it should know which of the data from core network is to be sent to mobile terminal 20. Therefore, base station 10 needs to inform base station 11 of the characterization information of mobile terminal 20 together with the pre-coding information.

Next, in step S212, for time frequency resource block TF, base station 11 selects a mobile terminal from mobile terminals 21, 23 and 25 as an object terminal to be served (jointly pre-coded) using time frequency resource block TF according to the pre-coding information of mobile terminal 20 and the previously obtained pre-coding information of mobile terminals 21, 23 and 25. Wherein, the orthogonality between the pre-coding information of the object terminal selected by base station 11 and the pre-coding information of mobile terminal 20 should satisfy a second predetermined condition.

Preferably, the second predetermined condition is expressed by the following two formulas:

$$v_{x,10} \perp v_{20,10} \tag{3}$$

$$v_{x,11} \perp v_{20,11} \tag{4}$$

wherein, x represents the identifier of the selected mobile terminal, e.g. 21, 23, etc.

Formula (3) represents that the pre-coding vector corresponding to base station 10 in the pre-coding information of the mobile terminal selected by base station 10 should be orthogonal to the pre-coding vector corresponding to base station 10 in the pre-coding information of mobile terminal 20.

Formula (4) represents that the pre-coding vector corresponding to base station 11 in the pre-coding information of the mobile terminal selected by base station 11 should be orthogonal to the pre-coding vector corresponding to base station 11 in the pre-coding information of mobile terminal 20.

It can be understood that since each base station needs to send two signal streams in the joint pre-coding scheme illustrated in FIG. 2, the orthogonality between the used pre-coding vectors is the more perfect the better in order to avoid the mutual interference between the two signal streams.

Of course, in some times, the condition specified in formulas (3), (4) may not be absolutely satisfied. In this case, base station 11 can refer to a physical quality representing the orthogonality between the pre-coding vectors. When it exceeds (or falls below) a predetermined threshold, it indicates that the orthogonality between the two pre-coding vectors fulfill the requirements. Those skilled in the art can implement the above procedure according to various known physical quantities representing orthogonality.

The present invention also provides an alternative way, wherein base station 11 which selects later waits for base station 10 to send selecting result, rather than periodically performing step S210 and S211 as illustrated in FIG. 2. In particular:

After receiving the pre-coding information of mobile terminal 20 sent in step S203, base station 11 broadcasts the pre-coding vectors of mobile terminal 20 in the cell, which includes two pre-coding vectors $v_{20,10}$ and $v_{20,11}$, which are selected by mobile terminal 20 for base stations 10 and 11, respectively.

Thereafter, mobile terminals 21, 23 and 25 calculates the following:

$$p_{i,11} = \frac{\|H_{i,11} v_{i,11}\|^2}{\|H_{i,11}\|^2}, \text{ wherein } v_{i,11} = \underset{\substack{c \in C \\ v_{20,11} c' = 0}}{\operatorname{argmax}} (\|H_{i,11} c\|) \tag{5}$$

$$p_{i,10} = \frac{\|H_{i,10} v_{i,10}\|^2}{\|H_{i,10}\|^2}, \text{ wherein } v_{i,10} = \underset{\substack{c \in C \\ v_{20,10} c' = 0}}{\operatorname{argmax}} (\|H_{i,10} c\|) \tag{6}$$

wherein i represents one of mobile terminal 21, 23, 25, C represents the codebook, c represents a pre-coding vector in the codebook, c' represents the conjugate transpose of c. This ensures that mobile terminal 21, 23 and 25 will select two pre-coding vectors which are respectively orthogonal to the pre-coding vectors of mobile terminal 20 to form its pre-coding information. $p_{i,10}$ and $p_{i,11}$ represent the largest normalized effective signal power achieved by mobile terminal i from base stations 10 and 11 after mobile terminal i (any one of 21, 23, 25) selects two pre-coding vectors which are respectively orthogonal to the pre-coding vectors $v_{20,10}$, $v_{20,11}$ of mobile terminal 20.

Then, mobile terminal 21, 23 and 25 each inform base station 11 of respectively selected pre-coding vectors $v_{21,10}$ (orthogonal to $v_{20,10}$) and $v_{21,11}$ (orthogonal to $v_{20,11}$), $v_{23,10}$ (orthogonal to $v_{20,10}$) and $v_{23,11}$ (orthogonal to $v_{20,11}$), $v_{25,10}$ (orthogonal to $v_{20,10}$) and $v_{25,11}$ (orthogonal to $v_{20,11}$). Additionally, these three mobile terminals further informs base station 11 of $p_{21,10}$ and $p_{21,10}$, $p_{23,10}$ and $p_{23,10}$, $p_{25,10}$ and $p_{25,10}$ calculated based thereon.

Then, according to this alternative way provided by the present invention, in step S212, base station 11 selects one of mobile terminal 21, 23 and 25 as the object terminal on TF, wherein the selected mobile terminal enable the value of $p_{i,10}+p_{i,11}$ to be maximal.

Assume that base station 11 selects mobile terminal 21 in step S212. Then, in step S213, base station 11 sends the characterization information and the pre-coding information, namely $v_{21,10}$ and $v_{21,11}$, of mobile terminal 21 to base station 10. Since base station 10 also needs to send downlink signal to mobile terminal 21, it should know which of the data from core network is to be sent to mobile terminal 21. Therefore, base station 11 needs to inform base station 10 of the characterization information of mobile terminal 21 together with the pre-coding information.

By now, base stations 10 and 11 complete the selection of object terminals and can start to send downlink signal to mobile terminals 20 and 21 based on joint pre-coding on TF.

In the example illustrated in FIG. 2, base station 10 having priority in selecting on TF makes, by means of broadcasting common pilot, a mobile terminal select pre-coding vector by itself so as to ensure the pre-coded downlink signal to have better signal quality at the mobile terminal.

Optionally, base station 11 may also not broadcast common pilot in step S200. Accordingly, in step S202, base station 10 selects a mobile terminal, for example mobile terminal 20, from mobile terminals 20, 22 and 24 as the object terminal on TF according to long-term channel information and principle such as maximum capacity principle or proportional fair principle. Thereafter, two pre-coding vectors are randomly allocated to mobile terminal 20, one of which corresponds to base station 10 and the other corresponds to base station 11. Then, in step S203, base station 11 is informed of the two pre-coding vectors allocated to mobile terminal 20 and characterization information of mobile terminal 20. Base station 11, in step S212, then selects a mobile terminal whose pre-coding vector and the pre-coding vector of mobile terminal 20 have better orthogonality as another object terminal base on the pre-coding information received in Step S211. Optionally, base station 11 may not broadcast the common pilot signal in step S210, but, after base station 10 sends the pre-coding information of mobile terminal 20 in step S203, randomly selects one of mobile terminals 21, 23 and 25 in the cell, e.g. mobile terminal 21 and allocates two pre-coding vectors having higher orthogonality with the pre-coding vector of mobile terminal 20 for it, and finally informs, in step S213, base station 10 of the pre-coding information and characterization information of mobile terminal 21.

This example can be regarded as a variance of the example illustrated in FIG. 2, which omits the signaling interaction in steps S200(S210), S201(S211) between base station and mobile terminal at a cost of worse directivity in selecting mobile terminals and worse performance in the aspects such as system overall throughputs in comparison with the example illustrated in FIG. 2.

In the above, how to select object terminals for a radio resource block has been discussed. An example for selecting object terminals for joint pre-coding when coordinating base stations uses multiple independent time frequency resource blocks will be discussed.

Based on the above description, a relative simple implementation way is to repeat the flow in FIG. 2 for each time frequency resource block. Of course, such way has certain shortcomings, namely that it is difficult to ensure fairness.

Figure 3:
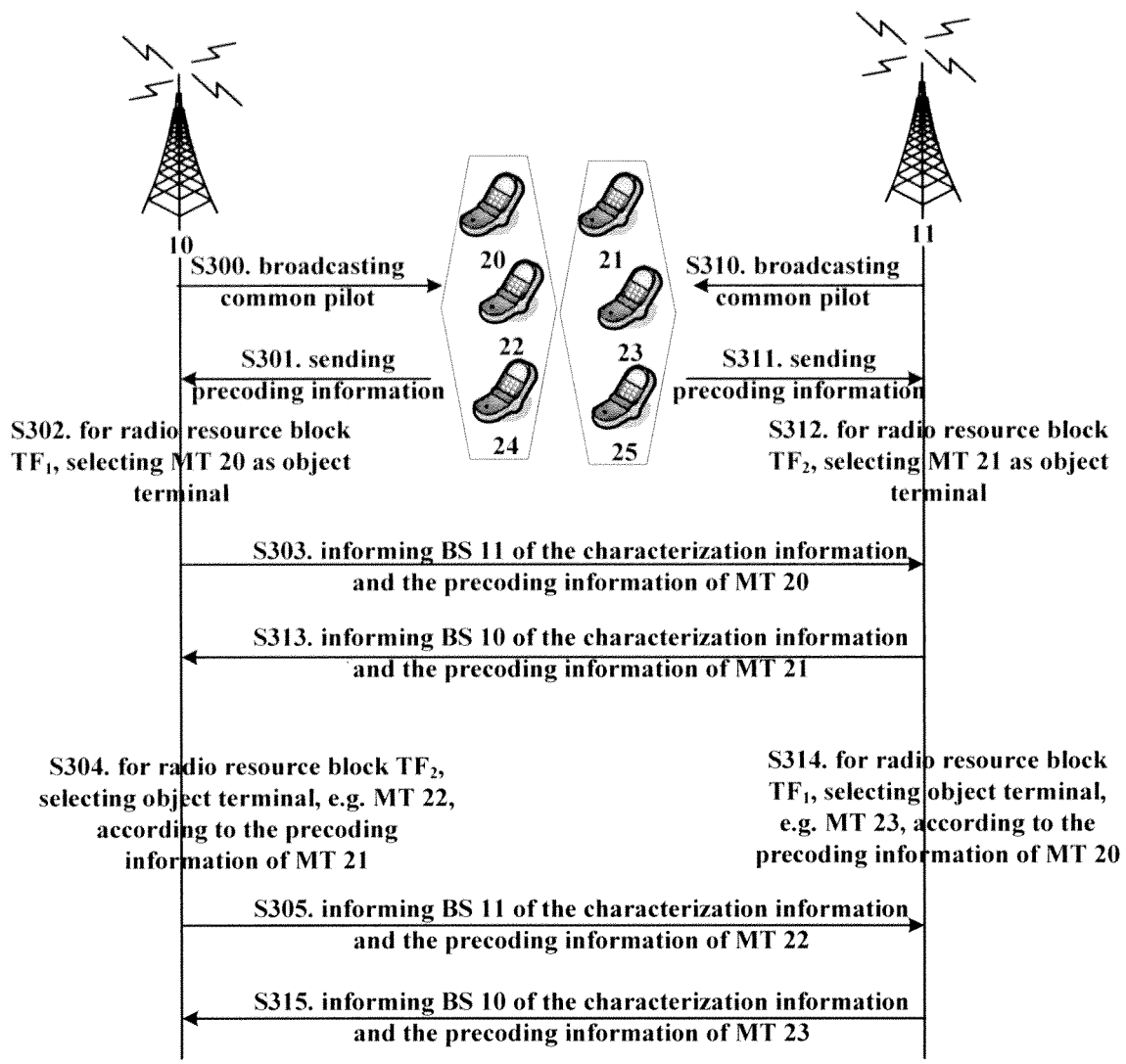
FIG. 3 illustrates a flow chart for a method of selecting object terminals in a multi-BS MIMO system based on joint pre-coding according to a preferable embodiment of the present invention.

Another optional way is illustrated in FIG. 3, which illustrates a flow chart for a method of selecting object terminals in a multi-BS MIMO system based on joint pre-coding according to a preferable embodiment of the present invention. This example will be introduced with reference to FIG. 3 in combination with FIGS. 4a and 4b in the below.

Still taking two coordinating base stations as an example. For two time frequency resource block TF1 and TF2, different priorities in selecting are assigned to respective base stations. Wherein on TF1, base station 10 has priority in selecting over base station 11, whilst on TF2, base station 11 has priority in selecting over base station 10, which ensures fairness. This is because that on time frequency resource block TF1, the selection of base station 11 is constrained to the selecting result of base station 10, and thus base station 11 may not be able to select the terminal which should have been selected in the cell. Here, the terminal which should have been selected refers to the terminal which is the most promising terminal to be selected according to proportional fair principle or maximum capacity principle. Hence, for TF1, the fairness among terminals in the cells served by base station 10, 11 obviously favors the former one. In order to compensate this, when there is another time frequency resource block that can be independent used for joint pre-coding, base station 11 which selects later on TF1 selects earlier on TF2. In this case, the fairness in turn favors the terminals in the cell of base station, thereby achieving the fairness between the two cells.

The flow in FIG. 3 is basically the same as that in FIG. 2. In steps S302 and S312, base stations 10, 11 respectively have priority in selecting an object terminal, which is assumed to be mobile terminals 20, on TF1 and TF2, and the basis for selecting can be maximum capacity principle or proportional fair principle.

Figure 4A:
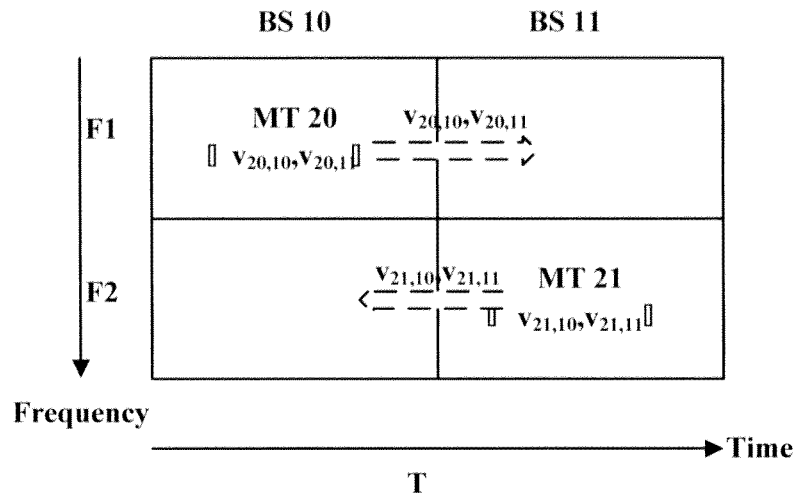
FIGS. 4a-4b are schematic views of the flow illustrated by FIG. 3.
Figure 4B:
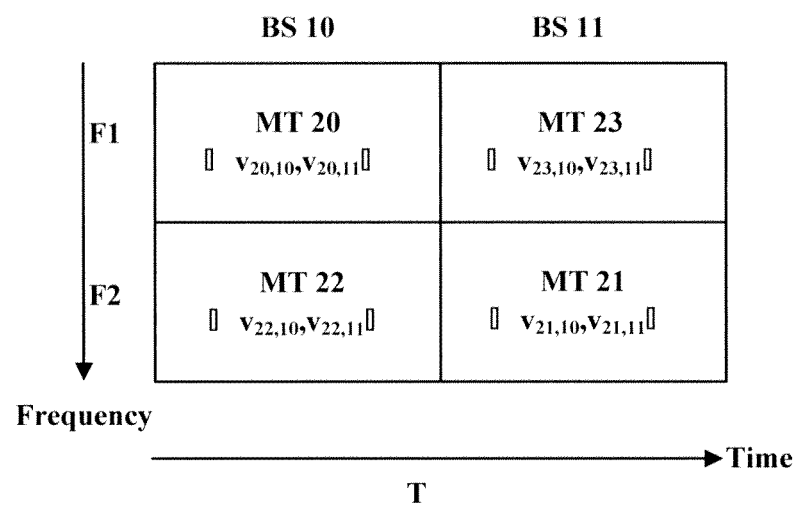

In the subsequent steps S303 and S313, base stations 10 and 11 respectively inform each other of the characterization information and pre-coding information of mobile terminals 20, 21 selected for TF1 and TF2, as shown in FIG. 4a. It should be understood that although in FIG. 3, step S313 is shown below step S303, it should not be understood as step S313 being performed after step S303 in any circumstance, and there is no order requirements between these two steps in the present invention.

Base on the selecting result informed by the coordinating base station, in steps S304 and S314, base stations 10, 11 respectively selects another object terminal on TF2, TF1. It is assumed that base station 10 selects mobile terminal 22 for TF2, and base station 11 selects mobile terminal 23 for TF1. Wherein taking base station 10 as an example, when it selects an object terminal for TF2 in step S304, mobile terminal 20 may be considered or may be excluded from the selecting in step S304 if base station 10 has already selected mobile terminal 20 for TF1. For example, if the traffic of mobile terminal 20 is large or mobile terminal 20 has a higher priority, mobile terminal 20 can still be regarded as a mobile terminal to be selected in step S304. Contrarily, if the time frequency resources allocated to mobile terminal 20 are sufficient, it can be excluded in step S304.

Wherein, the way how base stations 10, 11 select an object terminal in steps S304 and S313 can be referred to the introduction for step S212 with reference to FIG. 2, which will not be repeated here.

After respectively selecting mobile terminals 22, 23 as another object terminal on TF2, TF1, base stations 10 and 11 respectively inform, in steps S305 and S315, the other base station of the characterization information and pre-coding information of mobile terminals 22, 23.

It should be understood that in present invention, multiple time frequency resource blocks independently used for multi-BS joint pre-coding or interference cancellation can either adopt such frequency division manner like TF1, TF2 or adopt time frequency division manner. For example, on frequency band F, base station 10 has priority in selecting from time 0 to T, and base station 11 has priority in selecting from time T to 2T, wherein T can be a frame length or integral multiple of frame length.

Consider the scenario of more than two base stations performing joint pre-coding, wherein assume that there is base station A in the network illustrated in FIG. 1a, which performs joint pre-coding with base stations 10, 11 on the two time frequency resource blocks. Preferably, on TF1, the priority order of each base station from high to low is base station 10, base station 11 and base station A.

Thus, in order to ensure that the mobile terminals on TF1 selected by respective base stations have appropriate spatial properties. As a base station with the highest priority on TF1, base station 10 informs all base stations coordinating with it of the characterization information and pre-coding information of mobile terminal 20 after it selects mobile terminal 20 as an object terminal for TF1.

Next, base station 11 selects an object terminal, for example mobile terminal 21, on TF1 according to the way described in the above.

After selecting mobile terminal 21, base station 11 informs the other two base stations of the characterization information and pre-coding information of mobile terminal 21. Wherein, for base station 10, the pre-coding information of mobile terminal 21 is only used for subsequent multi-user pre-coding, but for base station A, the pre-coding information is also used to select an object terminal in addition to being used for subsequent multi-user pre-coding. Preferably, for the two pre-coding vectors of the mobile terminal selected by base station A, one is orthogonal to each of $v_{20,10}$ and $v_{21,10}$, and the other is orthogonal to each of $v_{20,11}$ and $v_{21,11}$. Thus, it can ensure that when any one of base station 10, base station 11 and base station A sends downlink signal to the three object terminals, there is no mutual interference among these signal streams.

Base station A also sends the pre-coding information and characterization information of the selected object terminal to base station 10 and base station 11 for subsequent multi-user pre-coding and identification of target terminal of data.

In the following, a particular embodiment based on interference cancellation will be described with reference to FIG. 5 in combination of FIG. 1b. As shown in FIG. 1b, taking base station 10 as an example, it should simultaneously avoid interference to mobile terminal 21 in the adjacent cell due to frequency reuse when sending downlink signal to mobile terminal 10 in its cell.

Figure 5:
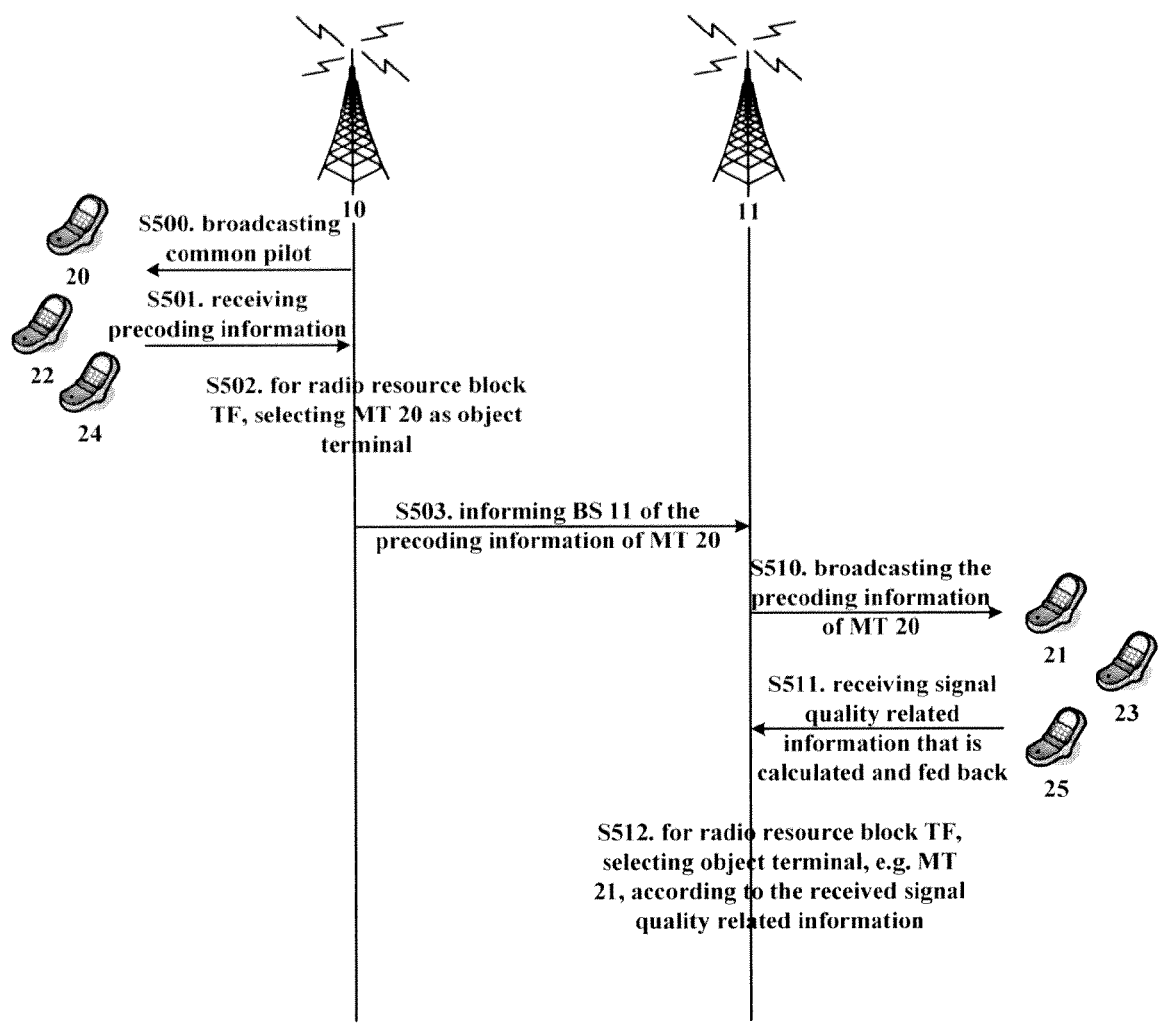
FIG. 5 illustrates a flow chart for a method of selecting object terminals in a multi-BS MIMO system based on interference cancellation according to a particular embodiment of the present invention.

In the example of two coordinating base stations illustrated in FIG. 5, firstly in step S500, base station 10 with priority in selecting broadcasts common pilot.

Thereafter, mobile terminals 20, 22 and 24 perform channel estimation for downlink channel based on the common pilot, and receive the pre-coding information fed back by respective mobile terminals 20, 22, 24 in the cell. Taking mobile terminal 20 as an example, which is the same for mobile terminals 22, 24, the pre-coding information sent from mobile terminal 20 comprises its two pre-coding vectors $v_{20,10}$ and $v_{20,11}$, which respectively correspond to base station 10 and base station 11, namely that the two pre-coding vectors are in one-to-one correspondence with the two base stations. Moreover, $v_{20,10}$ satisfies a third predetermined condition, and $v_{20,11}$ satisfies a fourth predetermined condition.

According to a particular embodiment of the present invention, said third predetermined condition comprises: when base station 10 uses $v_{20,10}$ to pre-code a signal sent to mobile terminal 20, the power of the pre-coded effective signal at mobile terminal is maximized, and said third predetermined condition can be expressed by the following formula:

$$v_{20,10} = \underset{c \in C}{\operatorname{argmax}}(\|H_{20,10}c\|) \qquad (7)$$

wherein $H_{20,10}$ is the channel matrix between base station 10 and mobile terminal 20, C is a codebook, c is a pre-coding vector in the codebook.

According to a particular embodiment of the present invention, said fourth predetermined condition comprises: when the coordinating base station of base station 10 uses $v_{20,10}$ to pre-code a signal sent to mobile terminal 20, the power of the pre-coded effective signal at the mobile terminal is minimized, and said fourth predetermined condition can be expressed by the following formula:

$$v_{20,11} = \underset{c \in C}{\operatorname{argmin}}(\|H_{20,11}c\|) \qquad (8)$$

wherein $H_{20,11}$ is the channel matrix between said coordinating base station and said mobile terminal, C is a codebook, c is a pre-coding vector in the codebook.

In step 501, mobile terminals 20, 22 and 24 send the pre-coding vectors $v_{20,10}$ and $v_{20,11}$, $v_{22,10}$ and $v_{22,11}$, $v_{24,10}$ and $v_{24,11}$ selected by themselves to their serving base station 10.

For time frequency resource block TF, let base station 10 select mobile terminal 20 as an object terminal in step S502. This means that base station 20 is to use TF to send downlink signal to mobile terminal 20, and simultaneously, base station 11 should avoid interference to mobile terminal 20 when it uses TF to send downlink signal to another object terminal on TF.

In order to assist base station 11 to pertinently select an object terminal on TF, base station 10 informs base station 11 of the pre-coding information $v_{20,10}$ and $v_{20,11}$ in step S503.

In the subsequent step S510, base station 11 broadcasts the pre-coding information of mobile terminal 20 in the cell. In particular, base station 11 broadcasts dedicated pilots respectively pre-coded by $v_{20,10}$ and $v_{20,11}$.

Next, in step S511, mobile terminal 21, 23 and 25 calculates signal quality related information and feeds it back to base station 11 based on the pre-coded dedicated pilots broadcasted by base station 11. According to an embodiment of the present invention, said signal quality related information comprises any one of the following, taking mobile terminal 21 as an example:

the effective signal power $\|H_{21,11}v_{20,11}\|$ at mobile terminal 21 of a signal pre-coded using the pre-coding vector $v_{20,11}$ of mobile terminal 21, when base station 11 uses the pre-coding vector $v_{20,11}$ corresponding to base station 11 in the pre-coding information to pre-code a signal sent to mobile terminal 21, and the interference power $\|H_{21,10}v_{20,10}\|$ at mobile terminal 21 of a signal pre-coded using the pre-coding vector $v_{20,10}$, when base station 10 (in comparison with base station 11, base station 10 is a first coordinating base station with higher priority in selecting) uses the pre-coding vector $v_{20,10}$ corresponding to base station 10 in the pre-coding information of mobile terminal 20 to pre-code a signal sent to mobile terminal 20, wherein the reason for calling it as interference power is easy to be understood, because in the scheme based on interference cancellation, the signal sent by base station 10 is required by mobile terminal 21;

the signal to interference power ratio at said mobile terminal, i.e. $\|H_{21,11}v_{20,11}\|/\|H_{21,10}v_{20,10}\|$, when base station 11 uses the pre-coding vector $v_{20,11}$ to pre-code a signal sent to mobile terminal 21, and base station 10 uses the pre-coding vector $v_{20,10}$ to pre-code a signal sent to mobile terminal 20.

Wherein, when mobile terminal reports $\|H_{21,11}v_{20,11}\|$ and $\|H_{21,10}v_{20,10}\|$, base station 11 may be required to calculate the signal to interference power ratio $\|H_{21,11}v_{20,11}\|/\|H_{21,10}v_{20,10}\|$ in subsequence calculation.

After receiving the received signal quality related information of mobile terminals 21, 23 and 25, base station 11 selects, without loss of generality, a mobile terminal with a maximal signal to interference power ratio therefrom as an object terminal to be served on TF.

Then, base station 11 pre-codes the signal sent to mobile terminal 21 using $v_{20,11}$, and base station 10 pre-codes the signal sent to mobile terminal 20 using $v_{20,10}$. Because mobile terminal 20 has already pertinently selected the pre-coding vector which enables the power of the pre-coded signal arriving at mobile terminal to be minimal for base station 11 based on formula (8), interference cancellation can be well achieved at mobile terminal 20. Furthermore, because base station 11 selects mobile terminal 21 with the maximal signal to interference power ratio as another object terminal, the interference to the downlink signal sent from base station 10 to mobile terminal 20 is also very limited at mobile terminal 21.

On this basis, the present invention can also be extended to the scenario of multiple time frequency resource blocks. By reading the description in combination with FIG. 5, a simplest implementation way is to repeat the flow in FIG. 5 for different time frequency resource blocks. However, this may lead to unfairness problem among base stations.

Figure 6:
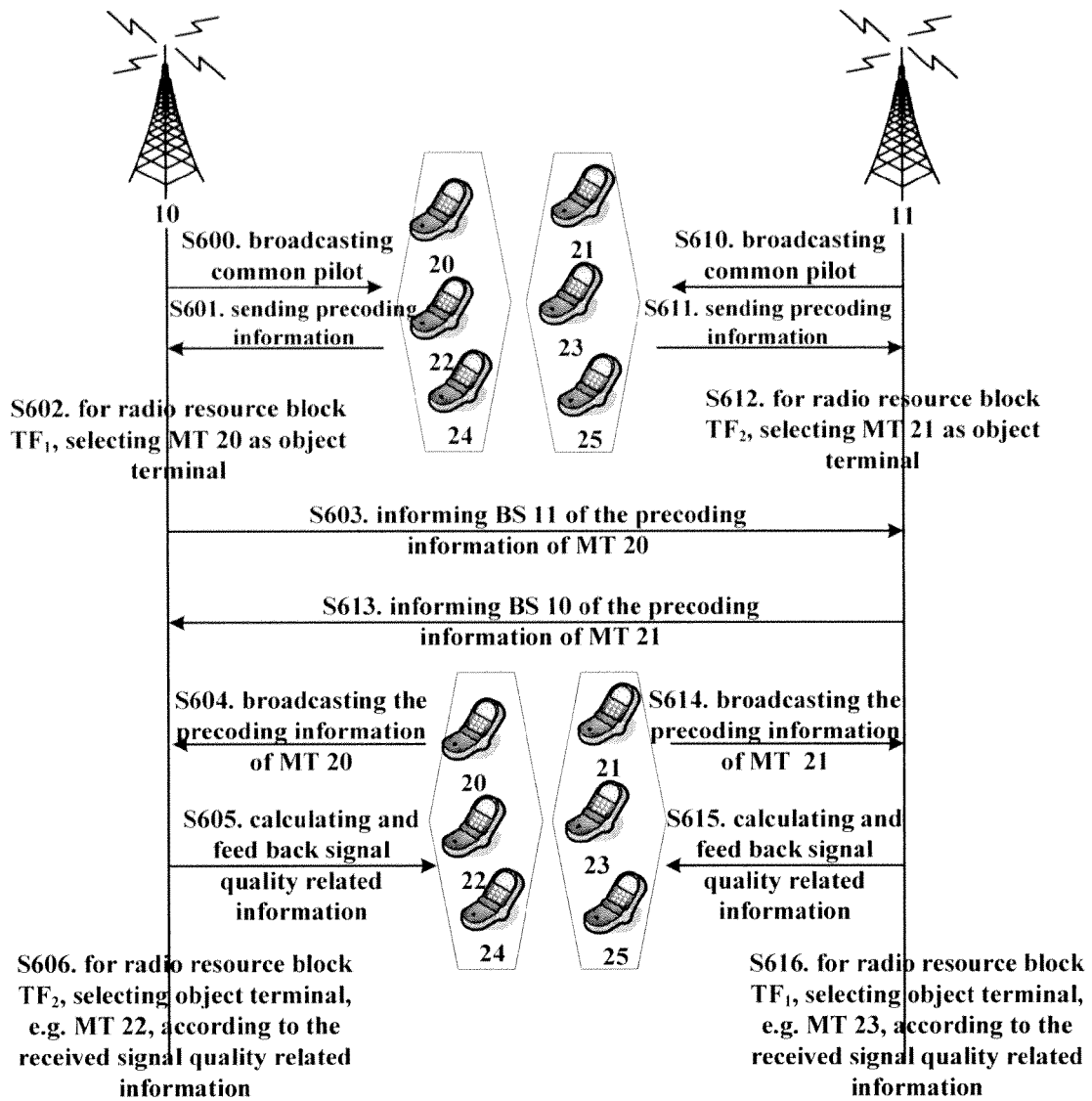
FIG. 6 illustrates a flow chart for a method of selecting object terminals in a multi-BS MIMO system based on interference cancellation according to a preferable embodiment of the present invention.
Figure 7A:
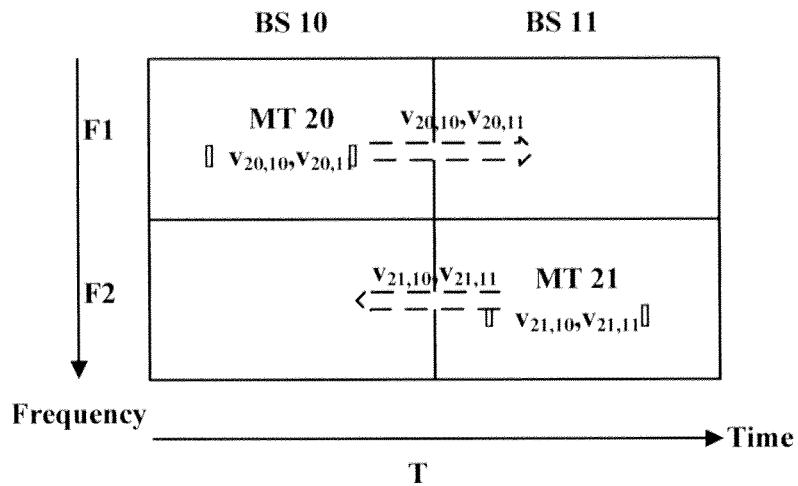
FIGS. 7a-7b are schematic views of the flow illustrated by FIG. 6.
Figure 7B:
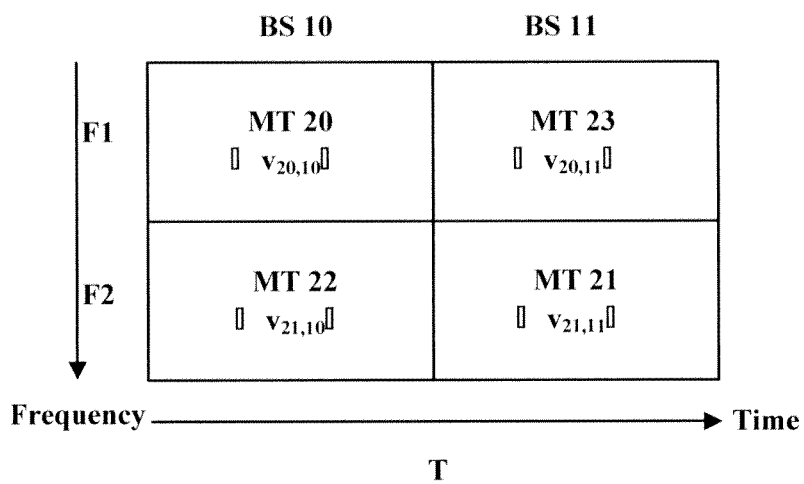

FIGS. 6, 7a, 7b describe a preferable scheme for selecting object terminals on multiple time frequency resource blocks. Wherein, base station 10 has a higher priority in selecting than base station 11 on TF1, whilst base station 11 has a higher priority in selecting than base station 10 on TF2. Thus, the fairness among base stations is well achieved.

The scenario illustrated in FIG. 6 should be readily understood. On TF1, base station 10 plays the same role as that in FIG. 5, namely the base station with a higher priority in selecting, and base station 11 also plays the same role as that in FIG. 5, namely obeying the selecting results of base station 10 to select an object terminal. The situation on TF2 is to the contrary. In this case, base station 11 plays the same role as base station 10 in FIG. 5, namely having priority in selecting and informing the selecting results to base station 10, and base station 10 is constrained by the selecting results of base station when selecting another object terminal on TF2, just like base station 11 in FIG. 5.

For brevity, steps S600-S606 and S610-S616 will not be described in details here, but only some brief descriptions for FIGS. 7a and 7b are given below.

FIG. 7a illustrates a procedure for base stations 10, 11 respectively having a higher priority on TF1 and TF2 to firstly selecting an object terminal. In particular, base station 10 selects mobile terminal 20 on TF1 and informs base station 11 of the pre-coding information ($v_{20,10}$, $v_{20,11}$) of mobile terminal 20. Base station 11 selects mobile terminal 21 on TF2 and informs base station 10 of the pre-coding information ($v_{21,10}$, $v_{21,11}$) of mobile terminal 20.

FIG. 7b illustrates the final selecting results, wherein base station 11 selecting mobile terminal 23 as the other object terminal on TF1 and pre-codes the signal to be sent to mobile terminal 23 using the pre-coding vector $v_{20,11}$; base station 10 selecting mobile terminal 22 as the other object terminal on TF2 and pre-codes the signal to be sent to mobile terminal 22 using the pre-coding vector $v_{21,10}$.

When extending the above scheme for selecting object terminals for multi-BS interference cancellation based on present invention to the scenario that more than 2 base stations coordinate with each other, one feasible way is that for a time frequency resource block, a base station is assigned with a higher priority in selecting, and the other base stations with lower priority in selecting only selects based on the selecting results of this base station with a higher priority, i.e. a first coordinating base station without referring to the selecting results of other base stations.

After the detailed introduction of each method flow, each apparatus provided by the present invention will be briefly introduced with reference to apparatus block diagrams in combination with FIGS. 1a and 1b in the below. The description for method flows in the above will be also referred.

Figure 8A:
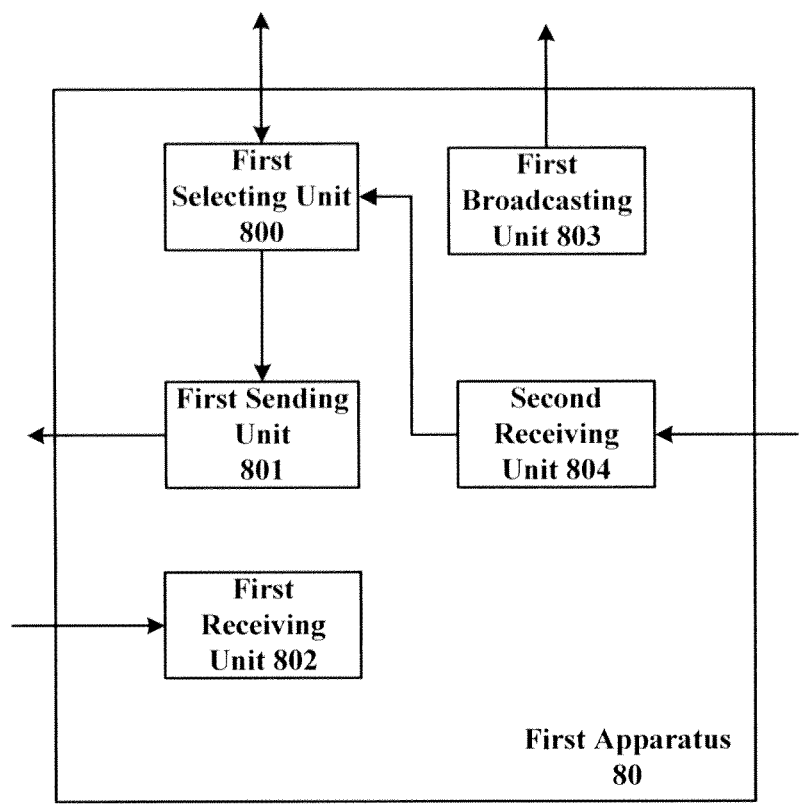
FIG. 8a illustrates a block diagram of a first apparatus for selecting an object terminal in a base station based on joint pre-coding according to a particular embodiment of the present invention.

FIG. 8a illustrates a block diagram of a first apparatus for selecting an object terminal in a base station based on joint pre-coding according to a particular embodiment of the present invention. The first apparatus 80 is typically located in a base station having higher priority in selecting in joint pre-coding scheme, for example, base station 10 illustrated in FIG. 2 or base stations 10, 11 illustrated in FIG. 3.

Taking base station 10 in FIG. 2 as an example, it has priority in selecting over other coordinating base station 11 on TF. The first apparatus 80 comprises:

A first selecting unit 800, for selecting a mobile terminal, mobile terminal 20, from mobile terminals 20, 22 and 24 served by the base station as the object terminal to be served using time frequency resource block TF.

A first sending unit 801, for sending characterization information of the selected object terminal namely mobile terminal 20 and its pre-coding information to each coordinating base station namely base station 11, for base station 11 to select other object terminal to be served using the TF from its served mobile terminals 21, 23 and 25. In this example, assume that base station 11 selects mobile terminal 21.

A first receiving unit 802, for receiving the characterization information of mobile terminal 21 and its pre-coding information sent from coordinating base station 11 of base station 10.

Based on the above units, modules, base station 10 can randomly allocate two pre-coding vectors, which respectively correspond to base station 10 and 11, for mobile terminal 20 selected based on long-term channel information.

According to a preferable embodiment of the present invention, the first apparatus 80 further comprises a first broadcasting unit 803 and a second receiving unit 804. The first broadcasting unit 803 is used to broadcast a common pilot signal, which is used by mobile terminals 20, 22 and 24 to perform channel estimation; the second receiving unit 804 is used to receive the pre-coding information respectively sent from mobile terminals 20, 22 and 24, and to use the pre-coding information sent from each mobile terminal as the pre-coding information of the corresponding mobile terminal. In this way, the pre-coding information of mobile terminal 20 sent to base station 11 by the first sending unit 801 may comprise the two pre-coding vectors selected by mobile terminal 20 by itself rather than those randomly allocated by base station 10, which makes the system performance even better.

Preferably, the pre-coding information sent from any mobile terminal in mobile terminals 20, 22 and 24 comprises a plurality of pre-coding vectors $v_{20,10}$ and $v_{20,11}$ which are in one-to-one correspondence with base station 10 and base station 11, and each of said pre-coding vectors satisfies a first predetermined condition. Non-limitedly, the first predetermined condition comprises: the power of the pre-coded effective signal at mobile terminal 20 is maximized when base station 10 uses $v_{20,10}$ to pre-code a signal sent to mobile terminal 20.

Figure 8B:
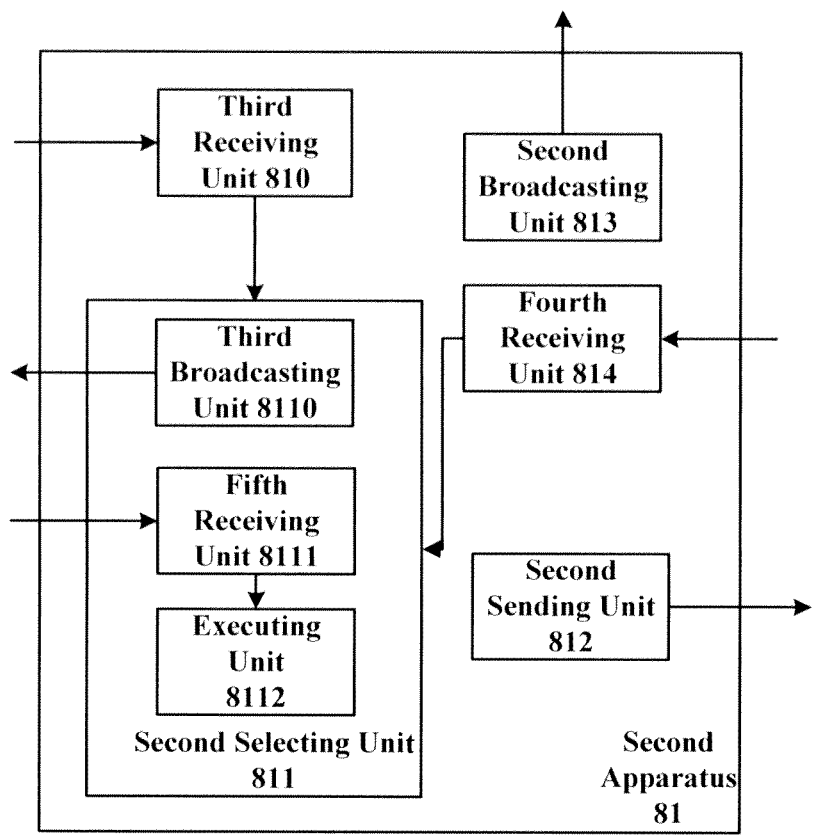
FIG. 8b illustrates a block diagram of a second apparatus for selecting an object terminal in a base station based on joint pre-coding according to a particular embodiment of the present invention.

FIG. 8b illustrates a block diagram of a second apparatus for selecting an object terminal in a base station based on joint pre-coding according to a particular embodiment of the present invention. The second apparatus 81 is typically located in a base station having lower priority in selecting in joint pre-coding scheme, for example, base station 11 illustrated in FIG. 2 and base stations 10, 11 illustrated in FIG. 3.

Taking base station 11 in FIG. 2 as an example, for time frequency resource block TF, coordinating base station 10 of base station 11 has priority in selecting over base station 11. The second apparatus 81 comprises:

A third receiving unit 810, for receiving, from coordinating base station 10, characterization information and pre-coding information of an object terminal namely mobile terminal 20 that is selected and to be served using time frequency resource block TF by coordinating base station 10.

A second selecting unit 811, for selecting, from mobile terminals 21, 23 and 25, a mobile terminal as an object terminal to be served using time frequency resource block TF according to the pre-coding information of mobile terminal 20 selected by coordinating base station 10. In this example, let base station 11 select mobile terminal 21 as the object terminal.

A second sending unit 812, for sending the characterization information and pre-coding information of mobile terminal 21 selected by the second selecting unit 811 to coordinating base station 10.

Preferably, the second apparatus 81 further comprises: a second broadcasting 813 for broadcasting a common pilot signal such that mobile terminals 21, 23 and 25 perform downlink channel estimation; a fourth receiving unit 814, for receiving pre-coding information respectively sent from mobile terminals 21, 23 and 25, and providing the pre-coding information sent from each mobile terminal as pre-coding information of the corresponding mobile terminal to the second selecting unit 811 for reference.

The second selecting unit 811 is further used to select a mobile terminal as the object terminal served using TF according to the pre-coding formation of the object terminal selected by coordinating base station 10, namely mobile terminal 20 and the received pre-coding information of mobile terminals 21, 23 and 25. Wherein, the orthogonality between the pre-coding information of the object terminal selected by base station 11, namely mobile terminal 21 and the pre-coding information of mobile terminal 20 satisfies a second predetermined condition.

Preferably, the second selecting unit comprises: a third broadcasting unit 8110 for broadcasting the received pre-coding information of mobile terminal 20 sent from coordinating base station 10, a fifth receiving unit 8111 for receiving the pre-coding information and the effective power information sent from mobile terminals 21, 23 and 25. Wherein, a second predefined condition is satisfied between the pre-coding information sent from each mobile terminal and the pre-coding information of the object terminal that is selected by any one of said at least one coordinating base stations to be served using said radio resource block; wherein the effective power information sent from each mobile terminal indicates the power of the pre-coded effective signal at the mobile terminal when said base station and said at least one coordinating base station each use a corresponding pre-coding vector in the pre-coding information sent from the mobile terminal to pre-code a signal sent to the mobile terminal.

The second selecting unit 811 further comprises an executing unit for selecting, from mobile terminals 21, 23 and 25, a mobile terminal such as mobile terminal 21 as an object terminal to be served by base station 11 using TF. Wherein, the sum of the respective effective signal power values included in the effective power information that is sent from mobile terminal 21 and received by the fifth receiving unit 8111 is maximal among the three mobile terminals.

The second predefined condition comprises: the pre-coding vectors corresponding to the same base station in respective pre-coding information are orthogonal to each other.

Considering the joint pre-coding under the coordinating of more than two base stations, wherein for TF, the priority in selecting of base station 11 is lower than base station 10 but is higher than a base station A, the second sending unit 812 is further used for sending the characterization information of the object terminal selected by base station 11, namely mobile terminal 21, and its pre-coding information to base station 10 and base station A, wherein the pre-coding information of mobile terminal 21 is used by base station A to select, from its served mobile terminal, other object terminal to be served using TF.

Figure 8C:
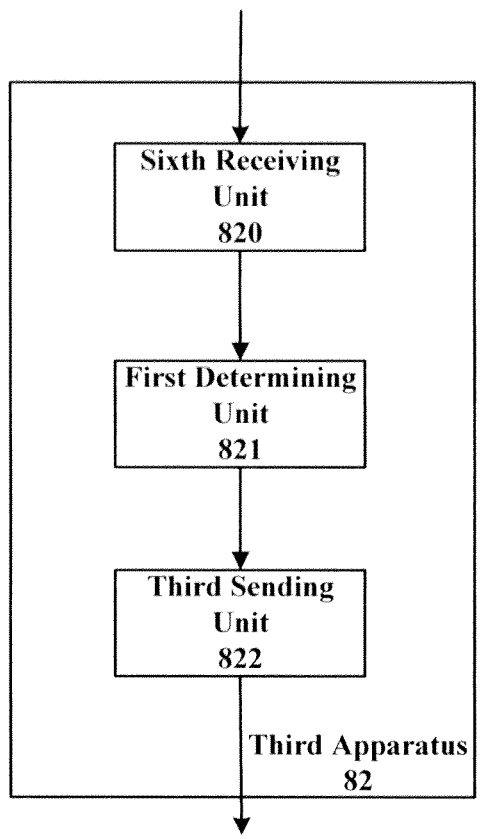
FIG. 8c illustrates a block diagram of a third apparatus for assisting selecting an object terminal for multi-BS joint pre-coding in a mobile terminal according to a particular embodiment of the present invention.

FIG. 8c illustrates a block diagram of a third apparatus for assisting selecting an object terminal for multi-BS joint pre-coding in a mobile terminal according to a particular embodiment of the present invention. The third apparatus 82 is typically located in the mobile terminal served by the base station having a relatively high priority in selecting based on the way of joint pre-coding. In some examples, it can also be located in the mobile terminal served by the base station having a relatively low priority in selecting.

By taking mobile terminal 20 in the embodiment shown in FIG. 2 as an example, the structure and functions of the third apparatus are described as follows: it comprises a sixth receiving unit 820 for receiving common pilot signals from the serving base station 10 and the other base station such as base station 11; a first determining unit 821 for determining the pre-coding information of mobile terminal 20 based on channel state information estimated by the common pilot signals from the serving base station 10 and the other base station such as base station 10, wherein the pre-coding information comprises two pre-coding vectors, $v_{20,10}$ (corresponding to base station 10) and $v_{20,11}$ (corresponding to base station 11), which are in one-to-one correspondence with the serving base station and the other base station 11, and each of the pre-coding vectors enables that the quality of the pre-coded effective signal satisfies a first predetermined condition at mobile terminal 20 when the corresponding base station uses the pre-coding vector to pre-code a signal sent to mobile terminal 20, and without loss of generality, said first predetermined condition comprises: the power of the pre-coded effective signal at the mobile terminal is maximal in comparison with selecting other pre-coding vectors; a third sending unit 822 for sending the determined pre-coding information $v_{20,10}$ (corresponding to base station 10) and $v_{20,11}$ (corresponding to base station 11) to the serving base station 10.

Figure 8D:
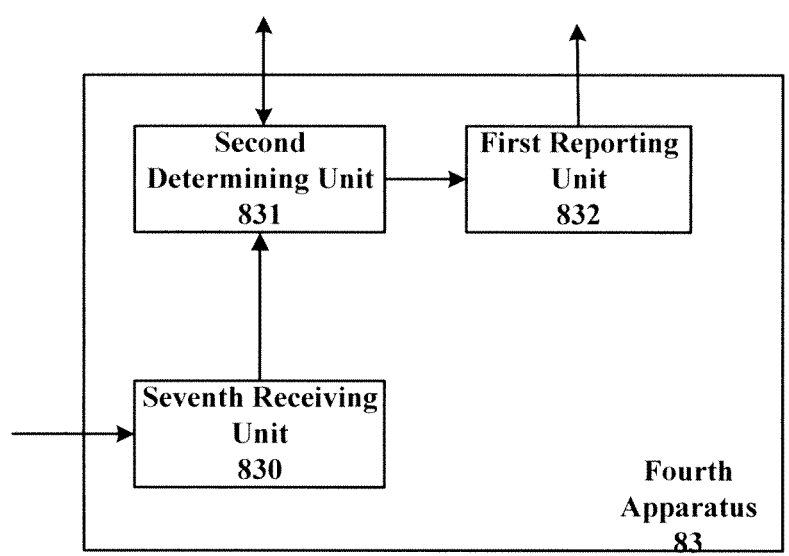
FIG. 8d illustrates a block diagram of a fourth apparatus for assisting selecting an object terminal for multi-BS joint pre-coding in a mobile terminal according to a particular embodiment of the present invention.

FIG. 8d illustrates a block diagram of a fourth apparatus for assisting selecting an object terminal for multi-BS joint pre-coding in a mobile terminal according to a particular embodiment of the present invention. The fourth apparatus 83 is typically located in the base station having relatively lower priority in selecting based on the way of joint pre-coding, for example in base station 11 of the example shown in FIG. 2. In the following, base station 11 and its served mobile terminal 21 in FIG. 2 are taken as an example.

For a time frequency resource block TF, the serving base station 11 of mobile terminal 21 has a lower priority in selecting than a coordinating base station 10. The fourth apparatus 83 comprises:

a seventh receiving unit 830 for receiving pre-coding information of an object terminal respectively selected by said at least one coordinating base station to be served using said radio resource block sent by said serving base station;

a second determining unit 831 for determining pre-coding information of mobile terminal 21 and calculating effective power information based on the pre-coding information of the object terminal, e.g. mobile terminal 20, selected by coordinating base station 10 to be served using TF; wherein a second predetermined condition is satisfied between the determined pre-coding information of mobile terminal 21 and the pre-coding information of mobile terminal 20 selected by the coordinating base station;

wherein the effective power information calculated by mobile terminal 21 indicates the power of e pre-coded effective signal at mobile terminal 21 when base station 11 and coordinating base station 10 respectively use a corresponding pre-coding vector in the pre-coding information determined by mobile terminal 21.

The fourth apparatus further comprises: a first informing unit 832 for informing the serving base station 11 of the pre-coding information of mobile terminal 21 determined by the second determining unit 831 and the calculated effective power information.

Preferably, the second predetermined condition comprises: the pre-coding vectors corresponding to the same base station in respective pre-coding information are orthogonal to each other.

Figure 9A:
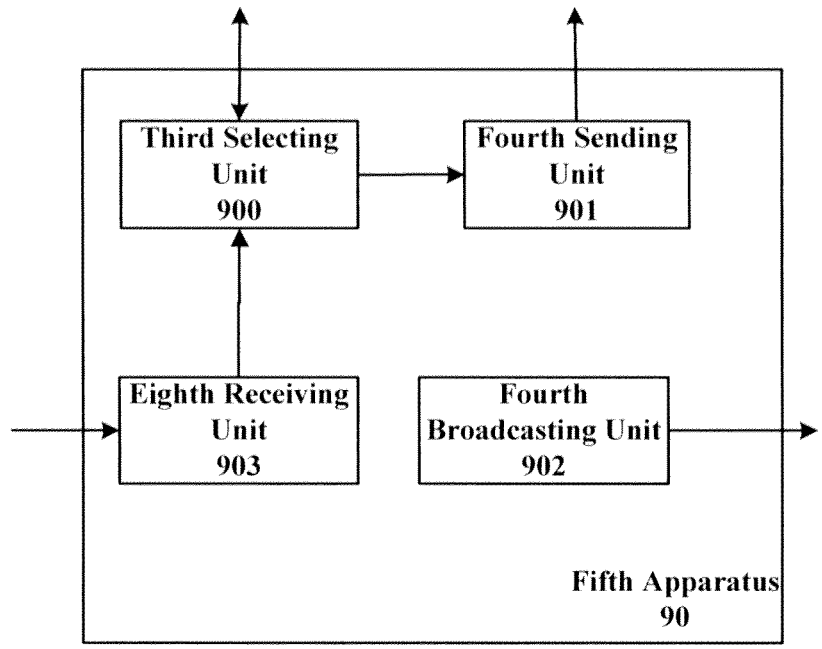
FIG. 9a illustrates a block diagram of a fifth apparatus for selecting an object terminal in a base station based on interference cancellation according to a particular embodiment of the present invention.

FIG. 9a illustrates a block diagram of a fifth apparatus for selecting an object terminal in a base station based on interference cancellation according to a particular embodiment of the present invention. The fifth apparatus is typically located in the base station having a relatively higher priority in the scheme of interference cancellation, such as base station 10 in FIG. 5, or base station 10 and base station 11 in FIG. 6.

Taking base station 10 in FIG. 5 as an example, for a TF, base station 10 has a higher priority in selecting than coordinating base station 11. The fifth apparatus 90 comprises:

a third selecting unit 900 for selecting, from mobile terminals 20, 22 and 24, an object terminal such as mobile terminal 20, wherein base station 10 will use TF to serve the object terminal, and coordinating base station 11 will cancel interference to mobile terminal 20 on TF;

a fourth sending unit 901 for sending pre-coding information of mobile terminal 20 to coordinating base station 11, for coordinating base station 11 to select, from mobile terminals 21, 23 and 25 served by it, an other object terminal, e.g. mobile terminal 21, wherein coordination base station 11 will use TF to serve mobile terminal 21, and base station 10 and other coordinating base stations (if there is any) will cancel interference to mobile terminal 21 on TF.

Based on the above functional modules, base station 10 may randomly allocate two pre-coding vectors for mobile terminal 20 which is selected based on long-term channel information, and send them to base station 11 via the fourth sending unit 901. However, this may not ensure the optimal system performance, and therefore, the present invention provides a further optimized scheme as follows:

Wherein, said fifth apparatus 90 further comprises:

a fourth broadcasting unit 902 for broadcasting a common pilot signal, which is used by mobile terminals 20, 22 and 24 to perform downlink channel estimation;

an eighth receiving unit 903 for receiving pre-coding information respectively sent from mobile terminals 20, 22 and 24, and using the pre-coding information sent from each mobile terminal as the pre-coding information of the corresponding mobile terminal. Taking mobile terminal 20 as an example, the pre-coding information sent from it comprises two pre-coding vectors $v_{20,10}$ (corresponding to base station 10, satisfying a third predetermined condition) and $v_{20,11}$ (corresponding to base station 11, satisfying a fourth predetermined condition).

Preferably, the third predetermined condition comprises: when base station 10 uses the pre-coding vector to pre-code a signal sent to mobile terminal 20, the power of the pre-coded effective signal at mobile terminal 20 is maximized, and the third predetermined condition is expressed by the following formula:

$$\underset{c \in C}{\operatorname{argmax}}(\|H_1 c\|) \qquad (9)$$

wherein $H_1$ is the channel matrix between base station 10 and mobile terminal 20, C is a codebook, c is a pre-coding vector in the codebook.

Preferably, the fourth predetermined condition comprises: when coordinating base station 11 uses the pre-coding vector to pre-code a signal sent to the mobile terminal, the power of the pre-coded effective signal at the mobile terminal is minimized, and the fourth predetermined condition is expressed by the following formula:

$$\underset{c \in C}{\operatorname{argmin}}(\|H_2 c\|) \qquad (10)$$

wherein $H_2$ is the channel matrix between coordinating base station 11 and mobile terminal 20, C is a codebook, c is a pre-coding vector in the codebook.

Figure 9B:
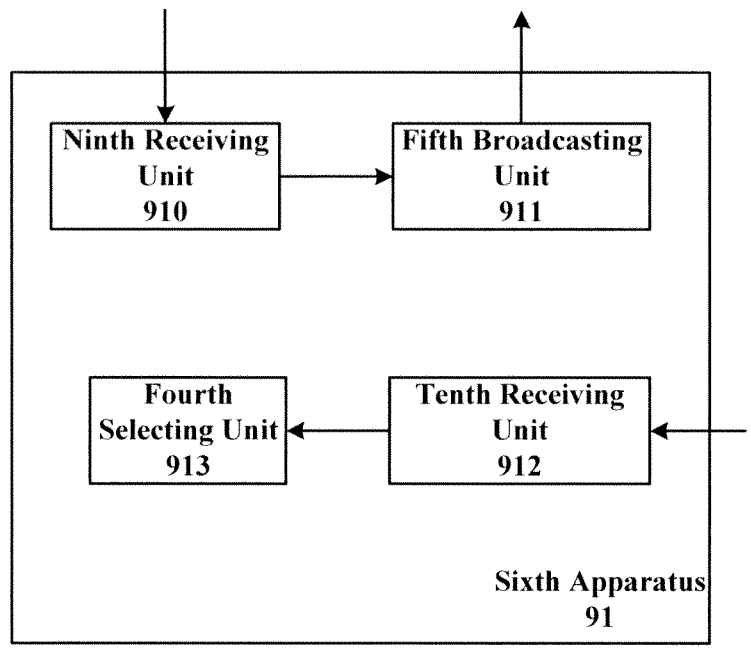
FIG. 9b illustrates a block diagram of a sixth apparatus for selecting an object terminal in a base station based on interference cancellation according to a particular embodiment of the present invention.

FIG. 9b illustrates a block diagram of a sixth apparatus for selecting an object terminal in a base station based on interference cancellation according to a particular embodiment of the present invention. The sixth apparatus 91 is typically located in a base station having a relatively low priority in the way of interference cancellation, such as base station 11 in FIG. 5 or base station 10 or base station 11 in FIG. 6.

Taking base station 11 in FIG. 5 as an example, wherein for TF, base station 11 has a lower priority in selecting than coordinating base station 10, and when there is other coordinating base stations, base station 10 is called as a first coordinating base station. The sixth apparatus 91 comprises:

a ninth receiving unit 910 for receiving pre-coding information of an other object terminal, e.g. mobile terminal 20, selected by the first coordinating base station 10 sent by the first coordinating base station 10, wherein the pre-coding information comprises two pre-coding vectors $v_{20,10}$ (corresponding to base station 10, satisfying a third predetermined condition) and $v_{20,11}$ (corresponding to base station 11, satisfying a fourth predetermined condition);

a fifth broadcasting unit 911 for broadcasting the received pre-coding information of mobile terminal 20;

a tenth receiving unit 912 for receiving signal quality related information calculated and fed back, by mobile terminals 21, 23 and 25 served by base station 11, based on the broadcasted pre-coding information;

a fourth selecting unit 913 for selecting an object terminal, e.g. mobile terminal 21, from mobile terminals 21, 23 and 25 based on the received signal quality related information, wherein the basis for the selection is, for example, that the signal (sent by base station 11) to interference (sent by base station 10) power ratio at mobile terminal 21 is maximal when base station 10 uses $v_{20,10}$ to send downlink signal to mobile terminal 20 and base station 11 uses $v_{21,10}$ to send downlink signal to mobile terminal 21.

Figure 9C:
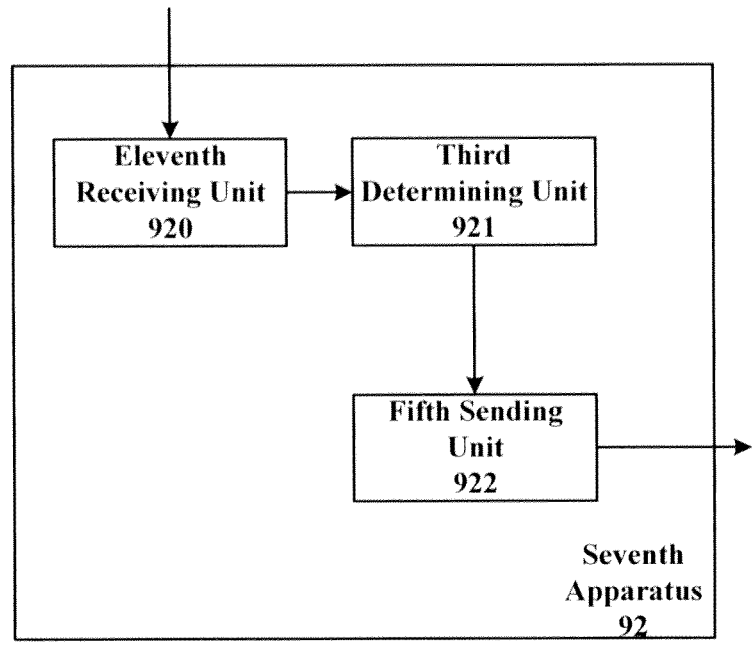
FIG. 9c illustrates a block diagram of a seventh apparatus for assisting selecting an object terminal for multi-BS interference cancellation in a mobile terminal according to a particular embodiment of the present invention.

FIG. 9c illustrates a block diagram of a seventh apparatus for assisting selecting an object terminal for multi-BS interference cancellation in a mobile terminal according to a particular embodiment of the present invention. The seventh apparatus 92 is typically located in a mobile terminal served by a base station having a relatively higher priority in the way of interference cancellation, such as mobile terminals 20, 22 and 24 in FIG. 5 or all mobile terminals in FIG. 6.

Taking mobile terminal 20 in FIG. 5 as an example, wherein for TF, the serving base station 10 of mobile terminal 20 has a higher priority in selecting than its coordinating base station 11. The seventh apparatus 92 comprises:

an eleventh receiving unit 920 for receiving common pilot signals from the serving base station 10 and the coordinating base station 11;

a third determining unit 921 for estimating channel state information based on the common pilot signals from the serving base station 10 and the coordinating base station 11, and determining the pre-coding information of mobile terminal which comprises two pre-coding vectors which are in one-to-one correspondence with the serving base station 10 and the coordinating base station 11, $v_{20,10}$ to base station 10, satisfying a third predetermined condition) and $v_{20,11}$ (corresponding to base station 11, satisfying a fourth predetermined condition);

a fifth sending unit 922 for sending the determined pre-coding information to the serving base station 10.

Figure 9D:
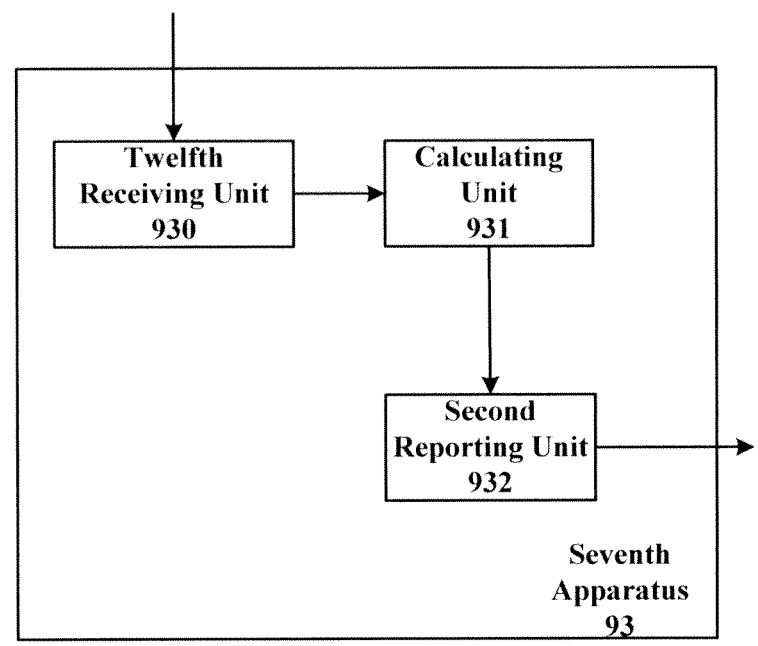
FIG. 9d illustrates a block diagram of an eighth apparatus for assisting selecting an object terminal for multi-BS interference cancellation in a mobile terminal according to a particular embodiment of the present invention.

FIG. 9d illustrates a block diagram of an eighth apparatus for assisting selecting an object terminal for multi-BS interference cancellation in a mobile terminal according to a particular embodiment of the present invention. The eighth apparatus 93 is typically located in a mobile terminal served by a base station having a relatively lower priority in the way of interference cancellation, such as mobile terminals 21, 23 and 25 in FIG. 5 or all mobile terminals in FIG. 6.

Taking mobile terminal 21 in FIG. 5 as an example, wherein for TF, the serving base station 11 of mobile terminal 21 has a lower priority in selecting than a first coordinating base station 10. The eighth apparatus 93 comprises:

a twelfth receiving unit 930 for receiving the pre-coding information of an other object terminal, e.g. mobile terminal 20, selected by the first coordinating base station 10 broadcasted by the serving base station 11, wherein the pre-coding information comprises $v_{20,10}$ (corresponding to base station 10, satisfying a third predetermined condition) and $v_{20,11}$ (corresponding to base station 11, satisfying a fourth predetermined condition);

a calculating unit 931 for calculating signal quality related information based on the pre-coding information of mobile terminal 20;

a second informing unit 932 for informing the serving base station 11 of the signal quality related information.

It should be noted that, the present invention is not limited to the above specific embodiments, and any variation or modification can be made by those skilled in the art without departing from the scope of the appended claims.

The invention claimed is:

1. A method of selecting, in a base station, an object terminal for joint pre-coding among said base station and one or more coordinating base stations, wherein, for a radio resource block, said base station has priority over said one or more coordinating base station in selecting, the method comprising:

selecting, from at least one mobile terminal served by said base station, a mobile terminal as an object terminal to be served using said radio resource block;

sending characterization information and pre-coding information of said object terminal to each coordinating base station, for each coordinating base station to select, from mobile terminals served by it, an other object terminal to be served using said radio resource block; and receiving characterization information and pre-coding information of the other object terminal selected by each coordinating base station to be served using said radio resource block sent from each coordinating base station.

2. The method according to claim 1, further comprising:

broadcasting common pilot signal, which is used by said at least one mobile terminal to perform channel estimation; and receiving pre-coding information respectively sent from said at least one mobile terminal, and using the pre-coding information sent from each mobile terminal as pre-coding information of the corresponding mobile terminal.

3. The method according to claim 1, wherein the pre-coding information sent from any mobile terminal of said at least mobile terminal comprises a plurality of pre-coding vectors which are in one-to-one correspondence with said base station and each coordinating base station, and each of said pre-coding vectors satisfies a first predetermined condition.

4. The method according to claim 3, wherein said first predetermined condition comprises: when said base station or any coordinating base station corresponding to said pre-coding vector uses the pre-coding vector to pre-code a signal sent to said mobile terminal, the power of the pre-coded effective signal at the mobile terminal is maximized.

5. The method according to claim 1, wherein said selecting further comprises:

selecting, from said at least one mobile terminal, a mobile terminal as an object terminal to be served on said radio resource block according to proportional fair principle or maximum capacity principle.

6. A method of selecting, in a base station, an object terminal for Multi-BS joint pre-coding among said base station and one or more coordinating base stations, wherein, for a radio resource block, at least one of said one or more coordinating base station has priority over said base station in selecting, the method comprising:

receiving, from said at least one coordinating base station, characterization information and pre-coding information of an object terminal that is selected and to be served using said radio resource block by each coordinating base station;

selecting, from said at least one mobile terminal, a mobile terminal as an object terminal to be served using said radio resource block according to the pre-coding information of an object terminal respectively selected by said one or more coordinating base stations; and sending the characterization information and pre-coding information of the object terminal selected by said base station to said one or more coordinating base stations.

7. A method of assisting, in a mobile terminal, selecting an object terminal for multi-BS joint pre-coding, comprising:

receiving common pilot signals from a serving base station of said mobile terminal and one or more other base stations;

determining pre-coding information of said mobile terminal based on channel state information estimated by the common pilot signals from said serving base station and said one or more other base stations, wherein the pre-coding information comprises a plurality of pre-coding vectors which are in one-to-one correspondence with said serving base station and each of said other base station, and each of said pre-coding vectors enables that the quality of the pre-coded effective signal satisfies a first predetermined condition at said mobile terminal when the corresponding base station uses the pre-coding vector to pre-code a signal sent to the mobile terminal; and sending the determined pre-coding information to said serving base station.

8. A method of assisting, in a mobile terminal, selecting an object terminal for multi-BS joint pre-coding, wherein for a radio resource block, a base station serving said mobile terminal has lower priority in selecting than a coordinating base station, said method comprising:

receiving pre-coding information of an object terminal respectively selected by said at least one coordinating base station to be served using said radio resource block sent by said serving base station;

determining pre-coding information of said mobile terminal and calculating effective power information based on the pre-coding information of the object terminal respectively selected by said at least one coordinating base station to be served using said radio resource block;

wherein a second predetermined condition is satisfied between the pre-coding information sent by each mobile terminal and the pre-coding information of an object terminal selected by any one of said at least one coordinating base station to be served using said radio resource block;

wherein the effective power information sent by each mobile terminal indicates the effective signal power value at the mobile terminal when said base station and said at least one coordinating base station respectively use a corresponding pre-coding vector in the pre-coding information sent by the mobile terminal; and said method further comprises:

informing said serving base station of the determined pre-coding information of said mobile terminal and the calculated effective power information.

9. A method of selecting, in a base station, an object terminal for Multi-BS interference cancellation performed by said base station and one or more coordinating base stations, wherein, for a radio resource block, said base station has higher priority in selecting than said one or more coordinating base stations, the method comprising:

selecting, from at least one mobile terminal served by said base station, an object terminal, wherein said base station will use said radio resource block to serve the object terminal, and said one or more coordinating base stations will cancel interference to said object terminal on said radio resource block; and sending pre-coding information of said object terminal to each coordinating base station, for each coordinating base station to select, from mobile terminals served by it, an other object terminal, wherein said coordination base station will use said radio resource block to serve the other object terminal, and said base station and other coordinating base stations will cancel interference to the other object terminal on said radio resource block.

10. The method according to claim 9, further comprising:

broadcasting a common pilot signal, which is used by said at least one mobile terminal to perform channel estimation; and receiving pre-coding information respectively sent from said at least one mobile terminal, and using the pre-coding information sent from each mobile terminal as pre-coding information of the corresponding mobile terminal.

11. The method according to claim 9, wherein the pre-coding information sent from any mobile terminal of said at least one mobile terminal comprises a plurality of pre-coding vectors which are in one-to-one correspondence with said base station and each coordinating base station, and the pre-coding vector corresponding to said base station satisfies a third predetermined condition, whilst the pre-coding vector corresponding to any coordinating base station satisfies a fourth predetermined condition.

12. The method according to claim 9, wherein said selecting further comprises:

selecting, from said at least one mobile terminal, a mobile terminal as an object terminal to be served using said radio resource block according to proportional fair principle or maximum capacity principle.

13. A method of selecting, in a base station, an object terminal for Multi-BS interference cancellation performed by said base station and a coordinating base station, wherein, for a radio resource block, said base station has lower priority in selecting than said coordinating base station, the method comprising:

receiving pre-coding information of an other object terminal selected by said coordinating base station sent by said coordinating base station;

broadcasting the received pre-coding information of said other object terminal;

receiving signal quality related information calculated and fed back based on said broadcasted pre-coding information by at least one mobile terminal served by said base station; and selecting an object terminal from said at least one mobile terminal based on the received signal quality related information.

14. A method of assisting, in a mobile terminal, its serving base station to select an object terminal for multi-BS interference cancellation among the serving base station and one or more coordinating base stations, wherein, for a radio resource block, said serving base station has higher priority in selecting than said one or more coordinating base stations, said method comprising:

receiving common pilot signals from said serving base station and each coordinating base station;

estimating channel state information based on the common pilot signals from said serving base station and each coordinating base station, and determining pre-coding information of said mobile terminal which comprises a plurality of pre-coding vectors which are in one-to-one correspondence with said serving base station and each coordinating base station, and the pre-coding vector corresponding to said base station satisfies a third predetermined condition, whilst the pre-coding vector corresponding to any coordinating base station satisfies a fourth predetermined condition; and sending the determined pre-coding information to said serving base station.

15. A method of assisting, in a mobile terminal, its serving base station to select an object terminal for multi-BS interference cancellation among the serving base station and one or more coordinating base stations, wherein, for a radio resource block, said serving base station has lower priority in selecting than a first coordinating base station of said one or more coordinating base stations, said method comprising:

receiving pre-coding information of an other object terminal selected by said first coordinating base station broadcasted by said serving base station;

calculating signal quality related information based on the pre-coding information of said other object terminal; and informing said serving base station of said signal quality related information.

* * * * *